US008124154B2

(12) United States Patent
Basker et al.

(10) Patent No.: US 8,124,154 B2
(45) Date of Patent: Feb. 28, 2012

(54) FRYER ATMOSPHERE CONTROL FOR MOLD FORM FRYER

(75) Inventors: Varadharajan Radhamani Basker, Plano, TX (US); Wilfred Marcellien Bourg, Jr., Melissa, TX (US); Steven Andrew Bresnahan, Plano, TX (US); Thomas George Crosby, Frisco, TX (US); Pravin Maganlal Desai, Carrollton, TX (US); Phillip Stuart Frazier, Frisco, TX (US)

(73) Assignee: Frito-Lay North America, Inc., Plano, TX (US)

( * ) Notice: Subject to any disclaimer, the term of this patent is extended or adjusted under 35 U.S.C. 154(b) by 58 days.

(21) Appl. No.: 12/760,727

(22) Filed: Apr. 15, 2010

(65) Prior Publication Data

US 2010/0196568 A1    Aug. 5, 2010

Related U.S. Application Data

(60) Division of application No. 11/056,660, filed on Feb. 11, 2005, now Pat. No. 7,798,058, which is a continuation-in-part of application No. 10/347,993, filed on Jan. 21, 2003, now Pat. No. 6,875,458.

(51) Int. Cl.
*A23L 1/01* (2006.01)
(52) U.S. Cl. ........................................ 426/438; 426/442
(58) Field of Classification Search .................... 99/404, 99/405, 407, 427, 467, 477, 474, 475, 476; 426/438, 439, 523, 441, 231, 233, 319, 510, 426/511, 442
See application file for complete search history.

(56) References Cited

U.S. PATENT DOCUMENTS

| 3,132,949 A | 5/1964 | Crowe |
| 3,294,545 A | 12/1966 | Cunningham |
| 3,353,962 A | 11/1967 | Smith |

(Continued)

FOREIGN PATENT DOCUMENTS

JP    03268718 A    11/1991

(Continued)

OTHER PUBLICATIONS

Banga, Julio R., "Improving Food Processing Using Modern Optimization Methods," Trends in Food Science & Technology, 2003 (36 pages).

*Primary Examiner* — Reginald L Alexander
(74) *Attorney, Agent, or Firm* — Bobby W. Braxton; Colin P. Cahoon; Carstens & Cahoon, LLP

(57) ABSTRACT

A mold form fryer utilizing a top conveyor that transports snack pieces through a constant velocity oil stream without the need of a bottom mating mold or conveyor. Herein, the form fryer having a fryer housing for controlling the frying atmosphere is provided with a top conveyor disposed above a fryer oil pan positioned longitudinally through the fryer. Uncooked snack pieces are provided to the fryer oil pan by a bottom entrance conveyor. A steam shield separates a front-end vestibule from the downstream portion of the fryer housing, and inert gas manifolds introduce inert gas into the front-end vestibule, thereby providing a sufficiently low oxygen and sufficiently low condensable gas or steam environment near the product submerging point.

9 Claims, 28 Drawing Sheets
(10 of 28 Drawing Sheet(s) Filed in Color)

U.S. PATENT DOCUMENTS

| | | | |
|---|---|---|---|
| 3,520,248 A | 7/1970 | MacKendrick | |
| 3,576,647 A | 4/1971 | Liepa | |
| 3,641,923 A | 2/1972 | Wilkinson | |
| 3,736,862 A | 6/1973 | Crommelijnck | |
| 3,774,003 A | 11/1973 | Kaufman | |
| 3,905,285 A | 9/1975 | Campbell | |
| 3,935,322 A | 1/1976 | Weiss | |
| 4,187,771 A | 2/1980 | Westover | |
| 4,363,823 A | 12/1982 | Kimura | |
| 4,366,749 A | 1/1983 | Caridis | |
| RE31,819 E | 1/1985 | Weiss | |
| 4,561,347 A | 12/1985 | Zaitu | |
| 5,066,505 A | 11/1991 | Vos | |
| 5,243,898 A * | 9/1993 | Sakuma | 99/408 |
| 5,408,924 A * | 4/1995 | Arendt et al. | 99/516 |
| 5,570,626 A | 11/1996 | Vos | |
| 5,652,010 A | 7/1997 | Gimmler | |
| 5,947,010 A | 9/1999 | Barry | |
| 5,988,048 A | 11/1999 | Hunter | |
| 6,403,135 B1 | 6/2002 | Graham | |
| 6,412,397 B1 | 7/2002 | McNeel | |
| 6,412,399 B1 | 7/2002 | Graham | |
| 6,875,458 B2 | 4/2005 | Dove | |
| 7,207,263 B2 | 4/2007 | Henson | |
| 2004/0028800 A1 * | 2/2004 | Basker et al. | 426/637 |
| 2004/0047973 A1 | 3/2004 | Bourhis | |

FOREIGN PATENT DOCUMENTS

| | | |
|---|---|---|
| JP | 2001-061676 | 3/2001 |

* cited by examiner

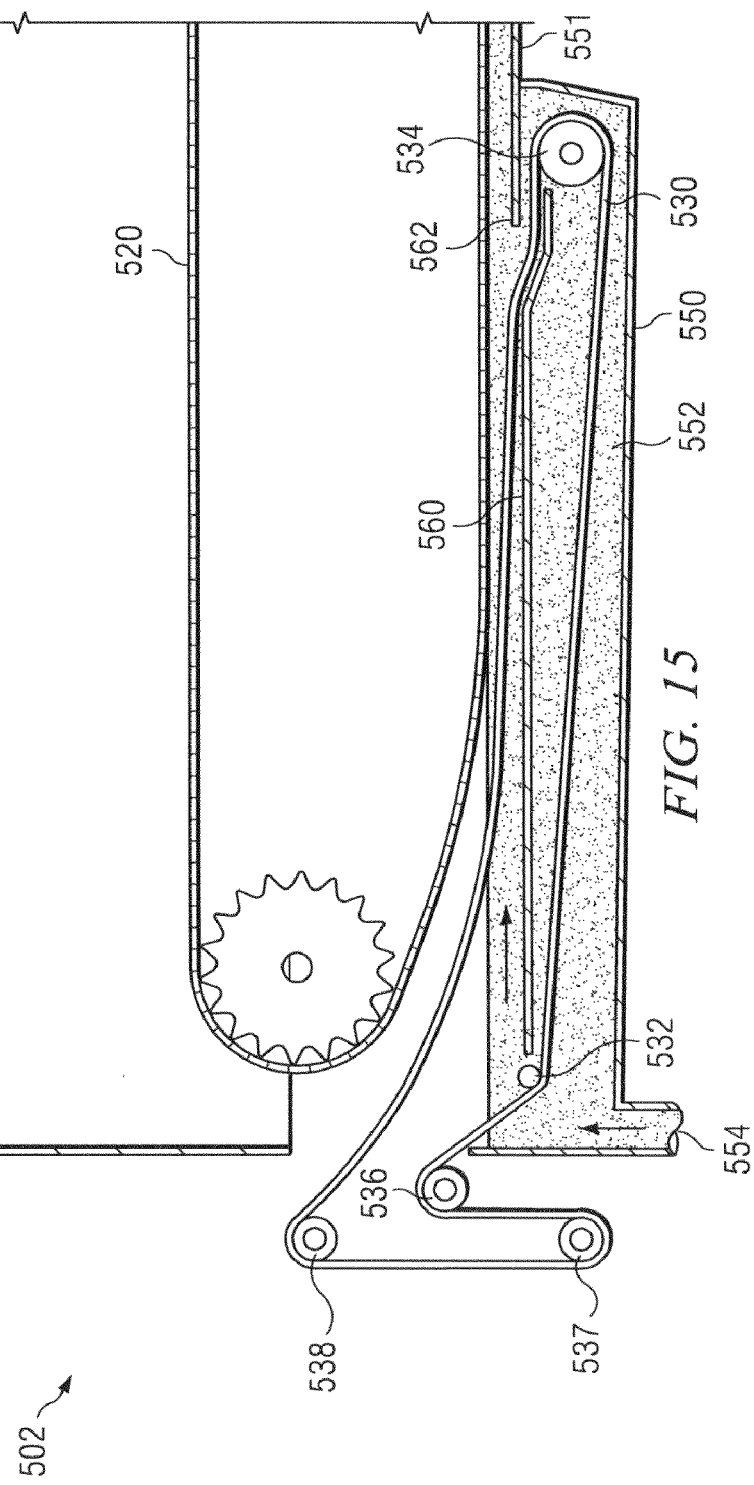

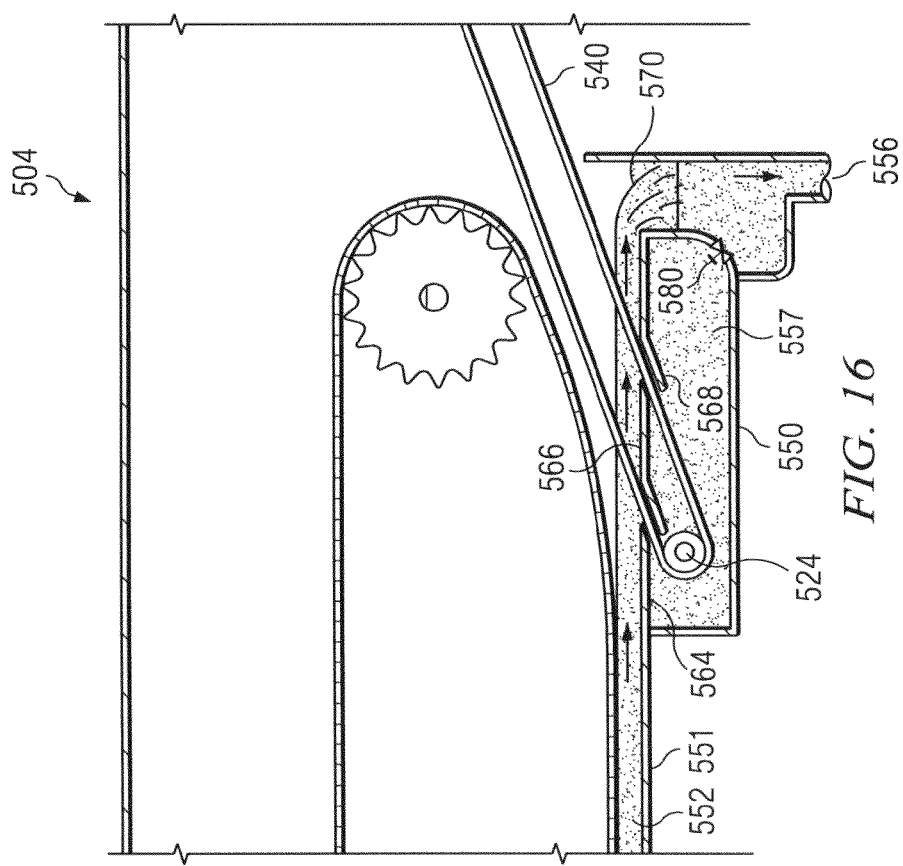

FRYER ATMOSPHERE CONTROL FOR MOLD FORM FRYER

CROSS-REFERENCE TO RELATED APPLICATION

This application is a divisional of U.S. application Ser. No. 11/056,660 entitled "Fryer Atmosphere Control for Mold Form Fryer" filed on Feb. 11, 2005, which is a Continuation-in-Part of U.S. patent application Ser. No. 10/347,993, now U.S. Pat. No. 6,875,458, titled "Single Mold Form Fryer with Enhanced Product Control" and filed on Jan. 21, 2003, the technical disclosures of which are hereby incorporated herein by reference.

BACKGROUND OF THE INVENTION

1. Technical Field

The present invention relates to improved atmosphere control for a fryer assembly for the fabrication of snack food. More particularly, the invention relates to using inert, non condensable and non reactive, gases with precise location of inert gas injection within an enclosed environment within the fryer housing in order to reduce frying medium degradation, such as oil, and product defects by reducing frying medium and product exposure to undesired condensable or reactive gases such as steam and oxygen.

2. Description of Related Art

Snack pieces are known to be prepared with the use of fryers. Generally, snack pieces such as fabricated potato crisps are formed from dough and are sheeted and cut into discrete pieces (pre-forms) for treatment. Treatment involves cooking the pre-forms in a fryer to produce cooked snack pieces. There are several types of prior art fryers typically used in the snack food industry for frying snack food products that require relatively even frying on all sides of the product. In general, these fryers cook product as it passes through in a stream of hot oil.

Particularly with potato crisps, a form fryer is beneficial because pre-forms can be molded and cooked into a desired product shape. A form fryer is a fryer for producing snack pieces having generally two conveyors, an upper and a lower conveyor. On each conveyor are molds or surfaces designed to interact with the opposing conveyor's molds or surfaces. After pre-forms are placed in the fryer, the top mold or contact surface keeps the now cooking pre-form beneath the surface of the oil until the fryer exit.

In general, potato slices release steam when they are fried. In many prior art deep-fat/oil frying processes, the amount of steam released during frying helps keep oxygen from entering and oxidizing the cooking oil. Fabricated potato pieces, however, typically have much lower moisture content upon frying compared to fresh potato slices. With less steam available to keep oxygen out of the fryer, the cooking oil oxidizes more rapidly. In the prior art, this problem has been addressed by introducing sparge steam into the atmosphere above the frying oil. Prior art systems also control oil oxidation levels by bleeding and discarding oil from the fryer and replacing discarded oil with fresh oil.

FIG. 1 shows an example of a prior art form fryer. The fryer assembly 10 has a fryer housing 12 that contains conveyors for moving pre-forms therethrough. To maintain desired environmental conditions within the housing 12, steam or inert gas may be circulated through portions above and around oil within the fryer and is supplied through a port 14, although additional ports may be added as needed. A top belt 20 is disposed in a top portion of the fryer housing 12 and is supported and rotated by two rollers 22, 24. A bottom belt 30 is disposed beneath the top belt 20. The bottom belt 30 is a continuous loop belt and is supported and rotated by two rollers 32, 34. A fryer pan 50 containing a body of oil 52 is situated within the fryer housing 12 so that at least a portion of the top and bottom belts 20, 30, when adjacent to each other, are passed through the oil 52. Oil 52 is circulated through a fryer pan 50 from an oil inlet 54 to an oil outlet 56 by, for example, a pump (not shown). Oil may be maintained at a desired cooking temperature with steam that is jacketed around the fryer pan 50.

For cooking, pre-forms are led towards the fryer by the bottom belt 30 starting at about the input-side roller 32. The pre-forms are then followed from above by the top belt 20 and led towards a point in the oil 52 where the bottom belt 30 comes into close proximity with the top belt 20. By at least this point, the pre-forms have made contact with at least one mold surface. While not depicted, molds are commonly placed on at least the exterior surface of the top belt 20 but may also be placed on the exterior surface of the bottom belt 30. Once the pre-forms are secured between the top and bottom belts 20, 30, which run substantially parallel to each other through the oil 52, they are introduced to the hot cooking oil 52 at an oil entry point 53. The pre-forms thereafter travel through the hot oil 52 in the oil pan 50 completely submerged until they emerge from the oil 52 at an oil exit point 55. A typical form fryer may be operated with an oil frying temperature between 240 to 400° F., although it is preferably operated between 320 to 380° F. Thereafter, the cooked snack pieces are transferred by the oil and conducted along the exit portion of the bottom belt 30 and are transferred to the next segment of the overall process at about the output-side roller 34 for seasoning, if desired, and packaging.

By using a form fryer such as the prior art example fryer assembly 10, snack foods, such as potato crisps, are capable of being fabricated with a standard and desirable shape. The frying of individual pieces presents numerous difficulties such as wrinkling, folding, clumping, and sticking to cooking surfaces. With the use of a form fryer, as opposed to other types of frying, a number of these difficulties can be resolved.

While form fryers resolve a significant number of problems in frying snack pieces, form fryers require a significant volume of oil. A large volume of equipment, along with the food product to be fried, must pass through hot oil and remain submerged for a time sufficient to cook the product. In traditional form fryers, there must be enough oil to submerge two conveyor belts, at least one product mold, and the product to be cooked. A considerable amount of energy, and thus money, is required to heat, pump and maintain this large volume of oil.

In addition, there is significant expenditure associated with replacing oxidized oil with fresh oil. Because form fryers typically have at least one conveyor with surfaces that cycle between the air and oil, the equipment itself introduces oxygen to the oil. Oil in the system gradually becomes oxidized as it absorbs oxygen at the air/oil interface and from submerging conveyor material. Oil oxidation causes oil to go rancid over time, thus the oxidized oil in the system must be replaced with fresh oil periodically. It would therefore be advantageous to reduce the volume of submerged equipment without adversely affecting the performance of the fryer. If the volume of submerged equipment can be reduced, the opportunity for such equipment to introduce oxygen into the oil can be reduced, thus slowing oxidation and reducing costs associated with replacing oxidized oil with fresh oil. In addition, expenditures for heating, pumping, and maintaining the oil can also be reduced.

A desirable feature of molded snack pieces is that they can be made uniform in size and shape. With uniformity, the snack pieces can be packaged in a seated alignment. This allows for the packaging of snack product into a canister as opposed to being packed loosely in a bag. Canister packaging provides a degree of protection against breakage of the snack pieces while providing improved transportability of the snack pieces both in bulk and in individual canisters. Also, canisters can be sealed with a lid after opening to deter product degradation.

For packaging of uniformly shaped product such as curved ellipses, (for example, an ellipse having its longer sides curved upward in the same direction) snack pieces are stacked first before filling in a canister. Snack pieces can be stacked one directly over another, or they can be partially overlapped in a similar manner as rooftop shingles are overlapped. After such overlapping, the product pieces are then pushed together so that each piece is directly over the other. While it is possible to stack curved product pieces either with concave sides up or concave sides down, the product pieces may be more amenable to stacking in one particular orientation, depending on the product shape.

For example, thin, elliptical product pieces having upwardly-curved sides are more easily stacked with their concave sides down rather than up. In the event that two adjacent product pieces fail to overlap, those pieces can only be forced to stack one over the other if their adjacent edges are at different heights. With their concave sides up, two adjacent elliptical product pieces cannot be restacked because their adjacent product edges would lie flat against the conveyor, and those edges would confront each other upon pushing the pieces together. With their concave sides down, however, the product pieces are able to rock back and forth on their downwardly curving edges in the direction of travel. This ability to rock makes it highly unlikely that the adjacent edges of two pieces would confront each other at the same vertical level. One product piece will thus be able to overlap and eventually stack over the other.

Conventional molds are convex and produce shaped snack pieces with concave sides facing upwards and away from the bottom belt. While the concave-side up orientation may be more suitable for seasoning, the concave-side down orientation, as previously explained, is often better for stacking. The product therefore must be flipped prior to packaging. If the cooked product left the fryer with concave sides facing down towards the fryer bottom belt, the product would not require flipping, albeit at the slight expense of seasoning efficiency.

Another problem encountered with prior art form fryers is the difficulty of providing a bottom conveyor that can accommodate the evolving shape of cooking product. As the product to be fried typically enters the fryer with one shape and exits with another, it is difficult to design a prior art bottom conveyor with product receptacles that can accommodate the shapes of both pre-forms and cooked product.

One solution to the above issues is disclosed in U.S. patent application Ser. No. 10/347,993, which is incorporated herein by reference. Specifically, a form fryer for cooking snack products is disclosed in accordance with one embodiment of that invention in FIG. 2. A fryer assembly 100 receives snack products to be fried at an entrance area 102. After cooking, the snack products exit the fryer assembly 100 at an exit area 104. Between the entrance area 102 and the exit area 104 is a fryer housing 112 having a port 114 for controlling the fryer environment above the cooking snack products. While shown as a single port, the port 114 is merely representative of numerous ports that can be provided as desired to effect additional embodiments. As shown, the fryer assembly 100 may be used to cook snack pieces made substantially from potatoes such as a dough comprising flaked dehydrated potatoes. Snack pieces formed by the present invention, however, may be comprised of alternative farinaceous mixtures.

Prior to being cooked, dough, formulated to produce the preferred snack pieces, is formed and sheeted into pre-forms (uncooked snack pieces). The dough typically comprises a substantially dry mixture of starch product, sugar and other additives. Examples of starch products that may be utilized include any starches, native (unmodified) and modified, selected for their ability to improve the texture, consistency, and durability of food products and to improve the processing of dough into food products, all as known in the field of art.

Returning to FIG. 2, the fryer assembly 100 processes pre-forms (not shown) through a form fryer with a top conveyor 120, a bottom entrance conveyor 130, and a bottom exit conveyor 140. On the top conveyor 120, a plurality of molds (not shown) are distributed about its exterior circumference for engaging and molding pre-forms to produce cooked shaped snack pieces. The top conveyor 120 may comprise an oil-pervious, chain-link structure of a durable material such as stainless steel or other metals, a ceramic, or a polymer-based material capable of withstanding exposure to hot oil. Supporting and conducting the top conveyor 120 are two rollers 122, 124. As shown, the two rollers 122, 124 may include teeth for engaging the top conveyor 120 to power the rotation. Generally, rotational power is provided by only one of the two rollers 122, 124.

For cooking, pre-forms are fed toward the top conveyor 120 on the bottom entrance conveyor 130. The bottom entrance conveyor 130 may comprise an oil-pervious, chain-link structure of a durable material such as stainless steel or another type of metal, a ceramic, or a polymer-based material capable of withstanding exposure to hot oil. Alternatively, the bottom entrance conveyor 130 may also comprise any food-grade, perforated, durable, but flexible material able to withstand frying oil temperatures. The bottom entrance conveyor 130 is supported and conducted by several rollers 132, 134, 136, 138, at least one of which is a submerged roller 134. As shown in FIG. 2, the path of the bottom entrance conveyor 130 about several rollers 132, 134, 136, 138 is one example of an entrance conveyor pathway in accordance with the invention. Desirable pathways include those that minimize removal of fryer oil, allow for cooling of the entrance conveyor, and are otherwise economical. The pathway set forth by this arrangement of rollers shown allows the bottom entrance conveyor 130 to pass through an area outside of the fryer housing 112. Traveling through an area outside of the fryer housing 112 allows the bottom entrance conveyor 130 to cool or be cooled prior to contacting pre-forms. Cooling the bottom entrance conveyor 130 helps minimize pre-form exposure to heat before entering the cooking oil 152. Such pre-cooking heat exposure can cause undesirable pre-form deformation and wrinkling.

The configuration in FIG. 2 is also beneficial because rotational power can be supplied to a roller outside of the fryer housing 112, such as the input-side roller 132. As the volume of a fryer housing is normally minimized for economical reasons such as heating and control of the fryer atmosphere, positioning equipment such as the input-side roller 132 outside of the fryer housing 112 is desirable. As will be shown, additional pathways are possible.

At about the input-side roller 132, pre-forms are deposited onto a feeding segment of the bottom entrance conveyor 130 and are conducted into the fryer housing 112. Alternatively, pre-forms can be deposited onto the bottom entrance conveyor 130 at a point closer to where the pre-forms enter the oil in order to reduce exposure to heat prior to immersion in the cooking oil 152. As pre-immersion thermal stress can cause pre-forms to wrinkle and deform, it is important to reduce heat exposure prior to cooking in the oil 152. Pre-immersion heat exposure also makes the pre-forms more likely to stick to the bottom entrance conveyor, which makes it more difficult to transfer the pre-forms to the top conveyor. Another way to reduce pre-immersion heat exposure is to minimize the length of the feeding segment of the bottom entrance conveyor. The feeding segment is the top surface of the bottom entrance conveyor between the input-side roller 132 and the submerged roller 134. For example, the bottom entrance conveyor can be led horizontally into the fryer housing, then tilted downwards into the oil as soon as possible after reaching the oil pan 150.

However, the bottom entrance conveyor must also be tilted downwards so that pre-forms on the bottom entrance conveyor 130 approach a location where the top conveyor 120 parallels and is in close proximity with the bottom entrance conveyor 130. The pre-forms are strategically positioned information on the surface of the bottom entrance conveyor 130 for eventual meeting with the molds on the top conveyor 120. At the point where the top and bottom conveyors begin to parallel each other in close proximity, pre-forms are disposed between the molds on the top conveyor 120 from above and the exterior surface of the bottom entrance conveyor 130 from below. To direct the pre-forms into the fryer oil pan 150 for cooking in the hot oil 152, the top conveyor 120 and bottom entrance conveyor 130 are guided along an arcuate pathway into the oil 152.

It is important to note that the gap between the top conveyor 120 and the bottom entrance conveyor 130, as well the angle at which both conveyors 120, 130 enter the oil, should be adjusted so that at least a portion of each pre-form is in contact with at least one conveyor at any time. If the gap and angle are not properly adjusted, the horizontal distance between the conveyors 120, 130 at the oil surface may be larger than the product length. The entire product must then remain at or near the oil surface for some distance while being transferred from the bottom entrance conveyor 130 to the top conveyor 120, during which time product control is undesirably lost. Thus, the gap and angle must be controlled.

When both the conveyor gap and angle are properly adjusted, the length of the air/oil interface between the top conveyor 120 and bottom conveyor 130 should be less than the length of each pre-form. In other words, the horizontal distance between the top conveyor 120 and the bottom entrance conveyor 130 at the oil surface, also known as the float length, should be less than the product length. This ensures that the product is under positive control at all times. For example, at a very shallow approach angle into the oil, only a small gap between the top conveyor 120 and bottom entrance conveyor 130 can be tolerated before the horizontal distance between them at the oil surface becomes as large as the product length. At a steep approach angle, however, a larger vertical gap between the two conveyors 120, 130 can be tolerated before the horizontal distance between them at the oil surface becomes as large as the product length. By keeping the float length shorter than the product length, at least one conveyor will be in contact with at least a portion of the product at any time in order to exert positive control over the product.

After the bottom entrance conveyor 130 contacts the oil 152 in an oil pan entrance area 158, the snack pieces encounter the hot oil 152 and begin to fry. At the same time that the frying begins, the declining top conveyor 120 forces the pre-forms to take the shape of the molds on the top conveyor 120.

Once the product is against the molds of the top conveyor 120, the bottom entrance conveyor 130 is no longer needed for the cooking of these snack pieces. The bottom entrance conveyor 130 then rotates about a submerged roller 134 and begins its return path to receive new pre-forms. This returning segment of the bottom entrance conveyor 130 is called the post-feeding segment. It should be noted that the pathways of the bottom entrance conveyor 130 and the bottom exit conveyor 140 are at least partially inclined in order to deliver the pre-forms into the oil from above.

It is important to note that the pre-forms do not necessarily have to be less dense than the oil 152 in order to remain against the molds of the top conveyor 120. While it is true that heavier-than-oil pre-forms would sink in stagnant oil, gases evolved from the oil 152 during cooking provide an upward force against the pre-forms. This upward force keeps the pre-forms firmly seated against the top conveyor molds.

Unlike conventional form fryers as shown and discussed above for the prior art fryer shown in FIG. 1, the discussed fryer assembly 100 and other fryer assemblies in accordance with the invention do not continue the bottom conveyor through the entire oil pan. As shown in FIG. 2, this allows for at least some segment of the fryer oil pan 150 to have a reduced volume segment 151.

Referring back to FIG. 2, the oil pan entrance area 158 is a section of the fryer oil pan 150 that is large enough to accommodate a submerged roller 134 and a fryer oil inlet 154. Hot oil 152 is circulated through the fryer oil pan 150 so that the oil 152 flows generally along and with the snack pieces as they cook. The oil inlet 154 provides the oil at the beginning of the oil pan 150, and the oil outlet 156 receives the oil at the end of the oil pan 150. Between the oil outlet 156 and the oil inlet 154, the oil may be purified, heated, and pumped if needed. In the preferred embodiment, the oil 152 travels with a velocity equal to or slightly less than that of the product and the top conveyor 120 in order to minimize disturbance of the product as it cooks. In addition, the velocities of the oil 152 and the various conveyors 120, 130, 140 can be stepped up from one to the next to increase positive control over the product. For example, the oil 152 can be made to flow slightly faster than the bottom entrance conveyor 130 in order to help dislodge the product from the bottom entrance conveyor 130. The top conveyor 120 can, in turn, be designed to move slightly faster than the oil 152 in order to keep the product pressed firmly against the top conveyor molds. Likewise, the bottom exit conveyor 140, to be later described, can move either at the same speed or slightly faster than the top conveyor 120 in order to properly transfer product from the top conveyor 120 to the bottom exit conveyor 140.

After the product travels downstream through the oil pan entrance area 158, a reduced volume segment 151 is encountered. As the width of the fryer oil pan does not change, it is the height in this segment 151 that is reduced. This reduction is possible along this segment because of the absence of a bottom conveyor, thus oil 152 is only needed at about where the snack pieces are cooking along the top conveyor 120. Therefore, the height along this segment 151 needs to at least accommodate the height of a top conveyor 120 with its molds but does not have to accommodate the height of two conveyors. Prior art form fryer assemblies utilizing conveyors require a volume of oil large enough to submerge a top conveyor with molds, a lower conveyor used to transport snack pieces into and out of the cooking oil 152, as well as rollers and other equipment necessary to guide those conveyors. This renders prior art form fryer assemblies more expensive to operate because of the need to heat, purify, pump, and maintain a larger volume of oil. Having a reduced volume segment 151 with no bottom conveyor, in accordance with the present invention, thus reduces the oil volume and cuts costs associated with oil heating and maintenance.

In addition, the reduced volume segment 151 with no bottom conveyor helps reduce the expenditure associated with replacing oxidized oil with fresh oil. Because there is no bottom conveyor throughout the reduced volume segment 151, there is less bottom conveyor material submerged in the oil at any time. Hence there is less opportunity for the bottom conveyors to introduce oxygen into the oil to oxidize it. This reduces the rate at which the oil becomes oxidized, as well the rate at which oxidized oil must be replaced with fresh oil. This is beneficial because oil oxidation causes the cooking oil 152 to go rancid, which in turn decreases the freshness of the product. Reducing oil oxidation therefore reduces costs expended to keep both the oil 152 and the product fresh.

Because the form fryer 100 with the reduced volume segment 151 dispenses with the need for a bottom conveyor through a portion of the fryer, less conveyor material is needed to bring pre-forms into the fryer. This means that less energy is therefore required to cool the bottom conveyor material before it receives pre-forms for transportation into the fryer. Having less bottom conveyor material also reduces the amount of necessary support machinery, such as rollers, supports, and drive shafts, which in turn reduces the likelihood of mechanical jams and malfunctions. Thus, the form fryer 100 with the reduced volume segment 151 can increase productivity both by reducing heating and cooling costs, as well as reducing the occurrence of mechanical malfunctions.

In the preferred embodiment, the oil pan 150 itself serves as a heat-exchanging surface through which heat may be transferred to the oil. To increase the heat-exchanging surface area, the oil pan 150 can be contoured or fluted. For example, the oil pan 150 may comprise a waved, rippled, or finned pan. Oil 152 thus flows in and above channels that run down the length of the oil pan 150. Such contoured or fluted oil pans provide a higher surface-area-per-volume ratio, allowing one to more efficiently replenish the heat dissipated and absorbed by cooking product as the oil travels along the fryer.

In order to keep the oil 152 in the fryer at the proper frying temperature, heated fluid may be provided to flow under and in contact with the oil pan 150. Other methods of heating the oil pan 150 are acceptable, such as using electrical heating elements under the oil pan, or using a radiative heat source to provide heat.

At the end of the reduced volume segment 151, snack pieces pass through the fryer oil pan exit 160. The fryer oil pan 150 at the exit 160 has an enlarged depth similar to the segment at the oil pan entrance area 158, but the depths of the entrance and exit sections are not necessarily identical. In the exit area, the bottom exit conveyor 140 approaches and parallels the top conveyor 120 after passing a submerged roller 142.

The bottom exit conveyor 140 is supported and rotated through a pathway, defined by several rollers 142, 144, 146, 148, which demonstrates one of many possible fryer exit conveyor pathways. Like the bottom entrance conveyor 130, the bottom exit conveyor 140 is constructed of any food-grade, flexible and durable materials that can withstand fryer processing conditions, such as metal, various plastics, or ceramics. The bottom exit conveyor 140 should also comprise an oil-pervious structure so that oil can pass through the conveyor.

A submerged roller 142 is situated before and below the point where the top conveyor 120 and the bottom exit conveyor 140 parallel each other in close proximity in order to allow the bottom exit conveyor 140 to gently approach the now cooked snack pieces. As the top and bottom conveyors 120, 140, with the cooked snack pieces encased between, exit the cooking oil 152, the upward forces of the cooking oil 152 no longer support the snack pieces against the top conveyor 120. The snack pieces are then directed into contact with a receiving segment of the bottom exit conveyor 140. If needed, steam or inert gas may be blown through or at the molds to assist the cooked snack pieces in their departure from mold surfaces. The bottom exit conveyor 140 should run parallel to the top conveyor 120 for some distance after it exits the oil 152 so that the product falls into its proper position when it finally dislodges. After passing over an exit-side roller 146, the cooked snack pieces are passed on for seasoning and packaging. After passing over the exit-side roller 146, the bottom exit conveyor 140 is directed back into the oil 152 to receive more snack pieces. This returning segment of the bottom exit conveyor is called the pre-receiving segment.

Note that FIG. 2 shows how the bottom exit conveyor transitions from an inclined path out of the fryer to a horizontal path before sending product to the next conveyor. At high conveying speeds, it is important for this transition to be as smooth and gradual as possible in order to prevent the product from losing contact with bottom exit conveyor 140. While FIG. 2 shows only one roller 144 in the transition between the inclined and horizontal sections, additional rollers may be used to make the change as gradual as possible.

Because the bottom entrance and exit conveyors 130, 140 operate independently from one another, each conveyor can be specifically designed for their respective product shapes. While the entrance conveyor 130, for example, might have a flat surface or a plurality of flat platforms for receiving flat pre-forms, the exit conveyor 140 might instead have curved saddles for receiving curved, cooked product. In addition, the bottom conveyors 130, 140 can be made from different materials and have different structures to suit their respective functions.

Another advantage of having separate entrance and exit conveyors 130, 140 is the ability to operate each one at a different speed. The bottom entrance conveyor 130 has a delivering velocity $V_{delivering}$, the oil 152 has an oil velocity $V_{oil}$, the top conveyor 120 has a top conveyor velocity $V_{top\ conveyor}$, the bottom exit conveyor 140 has a removing velocity $V_{removing}$, and the velocities of all four mediums may share the following relationship:

$$V_{delivering} \leq V_{oil} \leq V_{top\ conveyor} \leq V_{removing}.$$

In the preferred embodiment, the velocity of the exit conveyor 140 is either equal to or slightly greater than the velocity of the top conveyor 120, which is slightly greater than the velocity of the oil 152, which in turn is slightly greater than the velocity of the entrance conveyor 130. By operating each successive conveyor at a transporting velocity slightly greater than that of the preceding conveyor, more positive control can be maintained over the product, particularly at the inlet. Each successive medium in effect pulls the product along and away from the preceding medium.

However, if the cooked product tends to temporarily adhere to molds of the top conveyor 120 after exiting the oil 152, it is desirable to run the bottom exit conveyor 140 and top conveyor 120 at the same speed. This ensures that the product pieces fall into their proper places upon the bottom exit conveyor 140 after they finally dislodge from the top conveyor 120.

FIGS. 3-8 show several alternative embodiments in accordance with the present invention for fryer entrance area 202 and exit area 204. The fryer entrance area 202 in these figures comprises the same features and is of similar design and construction as described above for the fryer entrance area 102 in FIG. 2. Now referring to FIGS. 3-8 simultaneously, the fryer housing 212 is shown with the top conveyor 220 supported by two rollers 222, 224. A bottom entrance conveyor 230, having a feeding segment and a post-feeding segment, is supported by at least two of several rollers 232, 234, 235, 236, 237, 238. A fryer oil pan 250 contains hot oil 252. An area sufficient to contain an oil inlet 254 and at least one roller to support the bottom entrance conveyor 230 is shown within the oil pan entrance area 258.

In cooking, pre-forms are deposited onto the feeding segment of the bottom entrance conveyor 230 prior to entry into the fryer housing 212. As the pre-forms are conveyed into the oil, frying starts at a cooking start point 226. Thereafter, the snack pieces first begin to separate from the surface of the bottom entrance conveyor 230. Next, the portion of each piece that has separated from the bottom entrance conveyor 230 temporarily remains at the surface of the oil 252 before contacting the top conveyor 220. A submerged roller 234 in the oil pan entrance area 258 directs the post-feeding segment of the bottom entrance conveyor 230 back to collect new pre-forms for frying. The snack pieces, at the latest upon reaching the submerged roller 234, are disposed against the surfaces of the molds on the top conveyor 220. The snack pieces in position against the top conveyor 220 are then carried into a reduced volume segment 251 for completion of the cooking process. This reduced volume segment 251, shown in FIGS. 3-8, has the same characteristics and advantages as the reduced volume segment 151 of FIG. 2. These advantages include, but are not limited to, a reduction in oil heating, pumping, maintenance and replacement costs, a reduction in oil oxidation, a reduction in bottom conveyor cooling costs, and increased productivity due to a lower likelihood of mechanical failure.

In FIG. 3, a bottom entrance conveyor 230 is shown completely within an elongated section of an oil pan entrance area 258. This elongated section allows the conveyor to be completely within the fryer housing 212, which does not allow for cooling outside of the fryer housing 212. This reduces heat loss, reduces oil oxidation, and simplifies the path for the bottom entrance conveyor 230. However, depending on the application and materials involved, such arrangement may impart excessive heat to the pre-forms.

FIG. 4 shows a bottom entrance conveyor 230 following a pathway that has a substantial portion external to the fryer housing 212. As the bottom entrance conveyor 230 expands from exposure to the hot cooking oil and stretching, one or more of the rollers may be provided with the ability to move so that the conveyor can remain taut. For example, the lower, external, input-side roller 237 can move toward or away from the upper, external, input-side roller 238 to loosen or tighten the bottom entrance conveyor 230 as desired. This embodiment allows for significant cooling of the bottom conveyor 230.

Rotation may be provided from a roller positioned outside of the fryer housing 212 as shown in FIG. 5. This is advantageous, as the drive mechanism would not need to be outfitted to operate with a drive-shaft submerged in the hot oil 252. Simplifying the mechanisms within the hot oil 252 and the fryer housing 212 is beneficial because the size of the oil pan entrance area 258, and thus the volume of oil contained within, can be reduced. Further, a smaller portion of the equipment is exposed to heat and oil at any given time, thus reducing maintenance and cleaning intervals.

FIG. 6 shows an additional pathway for the bottom entrance conveyor 230. In FIG. 6, the bottom entrance conveyor 230 is lead out of the hot oil 252 by two rollers 235, 236 near the fryer entrance, but the bottom entrance conveyor 230 still remains within the fryer housing 212. This arrangement gives the bottom entrance conveyor 230 an opportunity to cool before receiving pre-forms without exposing the conveyor to the environment outside the fryer. FIG. 6 also shows, as does FIG. 4, an oil inlet 254 positioned between the feeding and post-feeding segments of the bottom entrance conveyor 230. With the oil inlet 254 so positioned, the oil passes through only the feeding segment of the bottom entrance conveyor 230 rather than both the feeding and post-feeding segments as it flows from the oil inlet 254 to the reduced volume segment 251. As there is one less layer of conveyor to hinder fluid flowing from the inlet 251 towards the exit of the fryer, less pressure is therefore needed to pump the oil 252 through the fryer at the desired flow rate.

In FIG. 7, another embodiment of a fryer entrance area 202 is shown with several pre-forms 216 disposed on the feeding segment of a bottom entrance conveyor 230. As pre-forms 216 are directed along towards the oil 252, molds on the surface of the top conveyor 220 are disposed directly above. As pre-forms 216 enter the oil 252 at a cooking start point 226, they are pushed downwards into the oil by the declining top conveyor 220 and wrap against the surface of the molds. After a submerged roller 234 redirects the bottom entrance conveyor 230 out of the oil 252 to receive more pre-forms, the cooking snack pieces 218 are conveyed along with the top conveyor 220 toward and through a reduced volume segment 251 having no bottom conveyor disposed beneath. As mentioned in the description of FIG. 2, oil 252 flows along with the product in order to minimize product disturbance.

FIG. 8 shows a plurality of cooking snack pieces 218 within the fryer exit area 204. The fryer exit area 204 of FIG. 8 comprises the same features and is of similar design and construction as described above for the fryer exit area 104 in FIG. 2. At the end of the reduced volume segment 251, the snack pieces 218 are conveyed over a section of the oil pan 250 containing a bottom exit conveyor 240. The bottom exit conveyor 240 is provided at an inclined angle that provides for a submerged roller 242 to be disposed sufficiently beneath the top conveyor 220. Thereby, the cooking snack pieces 218, which are still positioned against the mold surfaces of the top conveyor 220, will be disposed between the top conveyor 220 and the bottom exit conveyor 240 as the bottom exit conveyor 240 rises and rotates away from the submerged roller 242. Once free from contact with the oil 252, fully cooked snack pieces 219 either freely separate from the molds of the top conveyor 220 or may be dislodged with the use of steam or inert gas jets. Thereafter, the fully cooked snack pieces 219 are conveyed for seasoning and packaging.

FIGS. 9 and 10 show a plurality of molds 325 disposed upon a top conveyor 320. FIG. 9 shows a cross sectional transverse view of these molds upon a top conveyor 320. Upward forces from the cooking oil 352 support the cooking snack pieces 318 in position against the surfaces of a plurality of molds 325. These molds 325 are retained by a plurality of supports 327 to the top conveyor 320. The top conveyor 320 and molds 325 may comprise an oil-pervious, chain-link structure of a durable material such as stainless steel or another type of metal, a ceramic, or a polymer-based material capable of withstanding exposure to hot oil. Alternatively, the top conveyor 320 may also comprise any food-grade, perforated, durable, but flexible material able to withstand frying oil temperatures. Further, each mold 325 is formed with a plurality of holes or channels to allow steam and other gases to rise and pass through or by to escape from the cooking oil 352. This is provided to remove gases released from cooking which would otherwise collect and dislodge snack pieces.

FIG. 10 shows a perspective view of the molds 325 of FIG. 9. Here, a plurality of holes 329 is shown. In the preferred embodiment, these holes are drilled along axes normal to the top conveyor 320 rather than axes normal to the surface of the molds 325. Drilling holes in this manner helps prevent product from undesirably sticking to the mold surfaces when portions of pre-form material rise into the holes 329. FIG. 10 also shows transverse mold segments 326 hinged together in a chain-like manner. This allows the top conveyor 320 to have firm convex surfaces for molding food pieces while also being able to follow arcuate paths around rollers. Further, the molds 325 are arranged to form uniformly shaped snack pieces that may be stacked into a canister type container.

A plurality of fully cooked snack pieces 319 is shown in FIG. 11. The snack pieces 319 are conveyed on an exit conveyor 340 as they are directed on to seasoning and packaging. As the snack pieces 319 were formed from convex molds 325, the snack pieces 319 are concavely shaped with their concave sides up. As shown, the shape comprises an ellipse wherein the longitudinal edges of each cooked snack piece 319 are curved upward from the surface of the exit conveyor 340. While a generally elliptical shape is shown, other shapes are possible such as squares, circles, or triangles depending on the shape of the pre-forms.

FIGS. 12 and 13 show an alternative arrangement of molds as compared to the molds of FIGS. 9 and 10. In FIG. 12, a cross sectional transverse view of a top conveyor 420 having a plurality of molds 425 is shown wherein the molds 425 are concave relative to a plurality of snack pieces 418. Aside from the shape, the concave molds 425 in FIG. 12 are of similar construction as the convex molds 325 in FIG. 11. The concave molds 425 in FIG. 12 are held to the top conveyor 420 with a plurality of supports 427. With this design, the cooking snack pieces 418 form a convex shape with the convex side down. Like FIG. 10, FIG. 13 shows a plurality of transverse mold segments 426 hinged together in a chain-like manner. This allows the top conveyor 420 to have firm concave surfaces, concave relative to the cooking product, on a plurality of individual molds 425 for molding food pieces while also being able to follow arcuate paths around rollers. The molds 425 are attached to the top conveyor 420 by a plurality of supports 427 and have a plurality of holes 429 with the same properties as the holes described in FIG. 10.

The convex shapes of a plurality of fully cooked snack pieces 419 are shown in FIG. 14 as they are conveyed upon an exit conveyor 440. These snack pieces 419 are uniformly shaped so that they may be stacked. Once stacked, the snack pieces are ready for packaging. Because the snack pieces 419 are formed with a convex shape, there is no need to flip the snack pieces prior to stacking and packaging. This provides economic savings as a flipping device is not required. As shown, the shape comprises an ellipse wherein the longitudinal edges of each cooked snack piece 419 are curved downward toward the surface of the exit conveyor 440. While a generally elliptical shape is shown, other shapes are possible such as squares, circles, or triangles depending on the shape of the pre-forms.

While FIGS. 9-14 illustrate the use of uniformly shaped molds for producing stackable, uniformly shaped product pieces, many different mold shapes can be used, and even combined with one another, if randomly shaped, non-stackable end products are instead desired. For example, the cross-sectional views of alternative molds might resemble various segments of a sinusoidal curve.

FIGS. 15 and 16 show an entrance section 502 and an exit section 504 of a fryer utilizing several oil pan extensions 560, 562, 564, 566, 568 to isolate the cooking product from fluctuations in oil velocity due to changes in the cross-sectional area of the fryer's oil pan 550. The cross-sectional area of the oil pan 550 changes because, although the width remains constant, the depth varies. In FIG. 15, the oil pan entrance area 550 must be deep enough to accommodate the bottom entrance conveyor 530, whereas the reduced volume segment 551 does not have to accommodate the bottom entrance conveyor 530. Likewise, in FIG. 16, the depth of the oil pan 550 after the reduced volume segment 551 must increase to accommodate the bottom exit conveyor 540.

When the volumetric oil flow rate is fixed, the oil velocity is inversely proportional to the cross-sectional area through which the oil flows. In FIG. 3, for example, oil 252 flowing from an oil inlet 254 to a reduced volume segment 251 encounters a reduction in cross-sectional area as it enters the reduced volume segment 251. This reduction in cross-sectional area causes the velocity of the oil 252 to increase in the reduced volume segment 251. Consequently, there is a difference in the oil velocity over different areas of the oil pan 250 while the velocity of the top conveyor 220 remains constant. These velocity fluctuations can undesirably disturb the product and even prematurely dislodge the product from the molds of the top conveyor 220. In the preferred embodiment, the oil 252 flows with an oil velocity equal to or slightly less than the velocity of the top conveyor 220. As noted in the discussion of FIG. 2, the oil velocity can be designed to be slightly less than the top conveyor velocity and slightly greater than the entrance conveyor velocity in order to effect a positive transfer.

Without the use of pan extensions, the product must pass through three different oil velocity zones: a slow oil pan entrance area, a quick reduced volume segment, and a slow oil pan exit area. However, returning to FIGS. 15 and 16, a plurality of pan extensions 560, 562, 564, 566, 568 can be used to prevent oil velocity fluctuations around the product. For example, in FIG. 15, a first input-side pan extension 560 can be positioned within the oil pan, in the oil, and between the feeding and post-feeding segments of the bottom entrance conveyor. A second input-side pan extension 562 can similarly be positioned between the bottom entrance conveyor 530 and the reduced volume segment 551. In FIG. 16, a first output-side extension can be placed within the oil pan 550, in the oil 552, and between the reduced volume segment 551 and the receiving segment of the bottom exit conveyor 540. A second output-side extension can be placed between the receiving and pre-receiving segments of the bottom exit conveyor 540. Likewise, a third output-side extension can be placed between the pre-receiving segment of the bottom exit conveyor 540 and the downstream end of the oil pan 550.

With the pan extensions of FIGS. 15 and 16, the reduced-volume-segment velocity zone is effectively extended to begin before the product enters the oil and end after the product leaves the oil. Because all of the pan extensions are essentially level in the horizontal plane with the bottom of the reduced volume segment 551 of the oil pan 550, the cross-sectional area of the oil pathway remains constant. The oil velocity therefore remains constant as it flows from an oil inlet 554, over the various pan extensions, and through the reduced volume segment 551. The upstream pan extension 560 in FIG. 15 should extend some distance before the point where product enters the oil in order to give the oil time to adjust to the decrease in cross-sectional area. Likewise, the furthest downstream pan extension 568 in FIG. 16 should extend some distance beyond the point where cooked product exits the oil in order to isolate the product from any disturbance due to the increase in cross-sectional area at the end of the furthest downstream pan extension 568. Note, however, that the vertical positions of the various pan extensions can be altered slightly to compensate for changes in the volume of oil that passes over the pan extensions and through the reduced volume segment 551. For example, the vertical level of each pan can increase slightly from one to the next to compensate for the absorption of oil by the product.

In FIG. 15, the downstream edge of upstream oil pan extension 560, as well as the upstream edge of the downstream oil pan extension 562, should extend as close as possible to the bottom entrance conveyor 530. This ensures that the velocity zone above the oil pan extensions 560, 562 is separated as much as possible from the velocity zone below those pan extensions. Similarly, in FIG. 16, the upstream, midstream, and downstream pan extensions 564, 566, 568 should extend as close as possible to the bottom exit conveyor 540 in order to keep separate the oil velocity zones above and below those pan extensions.

Referring back to FIG. 15, the cross-sectional area of the oil pathway over the upstream oil pan extension 560 temporarily and slightly decreases as oil 552 passes through the bottom entrance conveyor 530. The oil 552 thus temporarily increases in velocity while it passes through the bottom entrance conveyor 530. Whereas an oil velocity disturbance further downstream would be undesirable once the pre-forms begin to cook against the top conveyor 520, this particular oil velocity increase is desirable. The slight increase in oil velocity helps the pre-forms dislodge from the bottom entrance conveyor 530 so that they can meet with the molds of top conveyor 520.

While FIG. 15 shows the use of pan extensions with one particular bottom entrance conveyor pathway as defined by a bottom entrance conveyor 530 and a plurality of rollers 532, 534, 536, 537, 538, other pathways may be used including, but not limited to, the pathways shown in FIGS. 3-7. Likewise, embodiments of fryer exit areas utilizing pan extensions are not limited to the specific arrangement of elements shown in FIG. 16. For example, FIG. 16 depicts one particular arrangement of elements in an exit area 504 wherein oil flows through the reduced volume section 551, over the furthest downstream pan extension 568, and down into a separate oil collection area 570 before exiting at an oil outlet 556. A valve 580 between the oil collection area and the body of oil under the exit-area pan extensions 564, 566, 568 can be modulated so that only a small fraction of the oil passing over those pan extensions passes between the pans, into a fairly stagnant area 557 containing a submerged roller 524 for the bottom exit conveyor 540, and through the valve 580. Alternatively, the oil 552 does not have to flow into a separate collection area 570. The oil might instead flow over and past the furthest downstream pan extension 568 to join with the rest of the oil 552 contained within the oil pan 550 and under the exit-area pan extensions 564, 566, 568.

FIGS. 17*a* and 17*b* illustrate the transition point between two conveyors 640, 645. They also show how a plurality of cooked product pieces 619 are conveyed smoothly from a bottom exit conveyor 645 to an intermediate transport conveyor 640 after the product pieces are removed from the fryer. FIG. 17*a* is a perspective view of only one lane of two successive, multi-lane, interlaced conveyors 640, 645, with each lane of one conveyor passing over the guiding roller 641, 642 of the other. FIG. 17*b* is a cross-sectional view of several lanes of two successive, multi-lane, interlaced conveyors. Now referring to FIGS. 17*a* and 17*b* simultaneously, by interlacing the discretely spaced lanes of two successive conveyors 640, 645, the product pieces 619 are under the positive control of at least one conveyor at all times. Suppose, for example, that product is transferred from the bottom exit conveyor 645 to the intermediate transport conveyor 640 in FIG. 17*a*. While on the exit conveyor 645, each piece is carried by seats 643, which support each product piece at its midsection. Once the product 619 reaches the interlaced portion of the conveyors 640, 645, each product piece is simultaneously supported at its midsection by seats 643, disposed upon conveyor 645, and near its edges by supporting panels 644, disposed upon conveyor 640. As product 619 continues past the interlaced portion of the conveyors 640, 645, the product pieces are no longer supported by seats 643 but are instead supported near its edges by supporting panels 644 upon the intermediate transport conveyor 640. Product can be transferred smoothly from conveyor to conveyor in this manner, with product support areas alternating between product midsections and product edges. Alternatively, product can be transferred in the opposite direction, from the product-edge-supporting conveyor to the product-midsection-supporting conveyor. In addition, the bottom exit conveyor can be designed to carry product out of the fryer by supporting the product near its edges rather than at its midsection. In such a case, the product can then be transferred to an intermediate conveyor that supports the product at its midsection.

With the use of form fryer assemblies made in accordance with the invention, equipment, heating, maintenance, oil, and other expenses are reduced because of the reduced volume of the fryer oil pan. By eliminating a continuous bottom conveyor within the fryer, a reduced fryer oil pan volume is possible and will not affect the quality of the snack pieces produced. Less supports and enclosures are needed in the fryer oil of the present invention as compared to prior art continuous conveyors as the bottom conveyors are not continuously running throughout the length of the fryer oil pan. With less equipment running through the fryer, oil oxidation can be reduced. In addition, productivity increases as there is less equipment that could potentially breakdown.

By eliminating a continuous bottom conveyor throughout the fryer and replacing it with separate bottom entrance and bottom exit conveyors, the frying process benefits from the ability to tailor each bottom conveyor to the differing pre- and post-cooking conditions. The bottom entrance and bottom exit conveyors can have differing shapes, comprise different materials, and rotate with differing speeds depending on what is appropriate for their functions, locations, and operating conditions. For example, in one embodiment of the fryer, the bottom entrance conveyor comprises a flat, perforated, polymeric sheet for receiving flat pre-forms, whereas the bottom exit conveyor comprises several lanes of chains with curved seats for receiving curved, cooked product.

A prior art approach to maintaining oil quality in reducing oxidation applied to the fryer described above would involve the addition of steam into a partially enclosed environment in order to purge the oil-gas interface of excess oxygen. As previously described, fabricated potato chips typically do not produce sufficient steam in a form fryer for this purpose, thus requiring the addition of steam. However, in either case, excess steam can accumulate on product introduced into the frying oil, which can lead to adverse consequences. In addition, in a high speed form frying process, the raw chips must be introduced into the fryer on a conveyor traveling at high velocity. The high speed conveyor and product can convey entrained air into the fryer front end increasing the level of oxygen in the fryer environment and increasing oil oxidation.

While the level of product defects is affected by many factors such as dough moisture content, lecithin content, and oil-flow turbulence, the inventors have discovered that steam condensation upon dough pieces at the fryer entrance (fryer front end) can also significantly affect the level of product defects. For example, product that accumulates excess steam upon entering the frying oil can experience problems remaining centered against molds or can fry in undesirable shapes with undesirable characteristics. An increase in steam levels in the frying atmosphere causes an increase in product defects but also decreases the rate of oxidation of the frying oil. The opposite happens with a decrease in steam levels. Therefore, the manipulation of steam levels alone requires a trade-off between oxygen values (or concentrations) and defect rates. Consequently, a need exists for an apparatus and method for simultaneously decreasing oxygen values and product defect rates rather than decreasing one at the expense of the other or discarding frying oil.

After frying, some prior art systems have also used nitrogen gas to keep oxygen away from finished product as it cools and is packaged. However, no prior art systems have combined the use of sparge steam and nitrogen gas within a fryer as disclosed herein to simultaneously reduce oil degradation rates and product defect rates.

Consequently, a need exists for an improved apparatus, as well as a method for designing and optimizing such an apparatus, for controlling the atmospheric conditions of a fryer, particularly when using a form fryer the same or similar to that described immediately above. Ideally, such improvements should purge oxygen from the frying environment while also reducing steam-related product defects.

SUMMARY OF THE INVENTION

A form fryer in accordance with a preferred embodiment of the present invention typically has a top conveyor to produce cooked snack pieces such as fabricated potato crisps with a desired shape. The top conveyor is disposed longitudinally within the fryer and is positioned above a fryer oil pan. Uncooked snack pieces are delivered by a bottom entrance conveyor into oil within the fryer oil pan for cooking. After delivering the uncooked snack pieces, the bottom entrance conveyor is configured to rotate away from the fryer oil pan after delivering the uncooked snack pieces. The snack pieces then rise up in the oil and dispose themselves against molding surfaces on the top conveyor. Note, however, that the fryer housing apparatus and optimization method of the present invention can also be used with other fryers, including prior art fryers.

In reference to a form fryer in a preferred embodiment, the present invention utilizes sparge steam in the main portion of the fryer and nitrogen gas introduced from precisely-placed points in or near a steam-shielded front end portion of the fryer housing. This combination of a steam shield and precisely placed nitrogen injection points can be manipulated in order to dramatically reduce the potential for steam/water deposit on the product as it enters the fryer. This method can also be designed to simultaneously reduce the amount of outside air entering the front of the fryer hood resulting in a significant reduction of oil oxidation/degradation. Thus, the invention provides a way to achieve simultaneous reduction in fried product defects and oil oxidation/degradation.

The above as well as additional features and advantages of the present invention will become apparent in the following written detailed description.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The novel features believed characteristic of the invention are set forth in the appended claims. The invention itself, however, as well as a preferred mode of use, further objectives, and advantages thereof, will be best understood by reference to the following detailed description of illustrative embodiments when read in conjunction with the accompanying drawings, wherein:

FIG. 15 is a schematic cross sectional view of a form fryer entrance section in accordance with the fryer disclosed in U.S. patent application Ser. No. 10/347,993 showing oil pan extensions;

FIG. 16 is schematic cross sectional view of form fryer exit section in accordance with the fryer disclosed in U.S. patent application Ser. No. 10/347,993 showing oil pan extensions;

FIG. 17b is a front sectional view of the snack pieces and interlaced conveyors of FIG. 17a;

DETAILED DESCRIPTION

Apparatus

Figure 1:
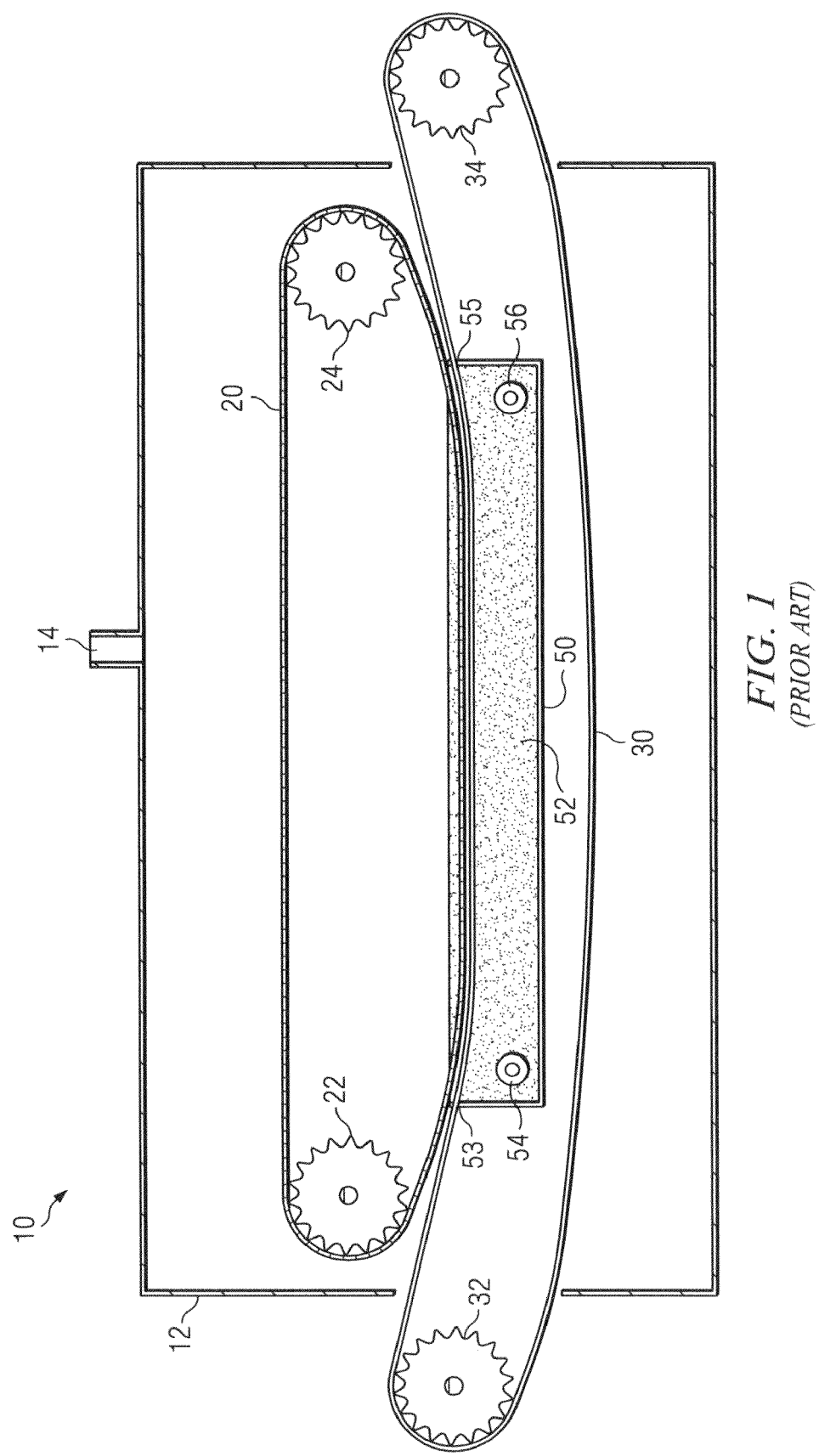
FIG. 1 is a schematic cross sectional view of a prior art form fryer with continuous top and bottom conveyors.
Figure 2:
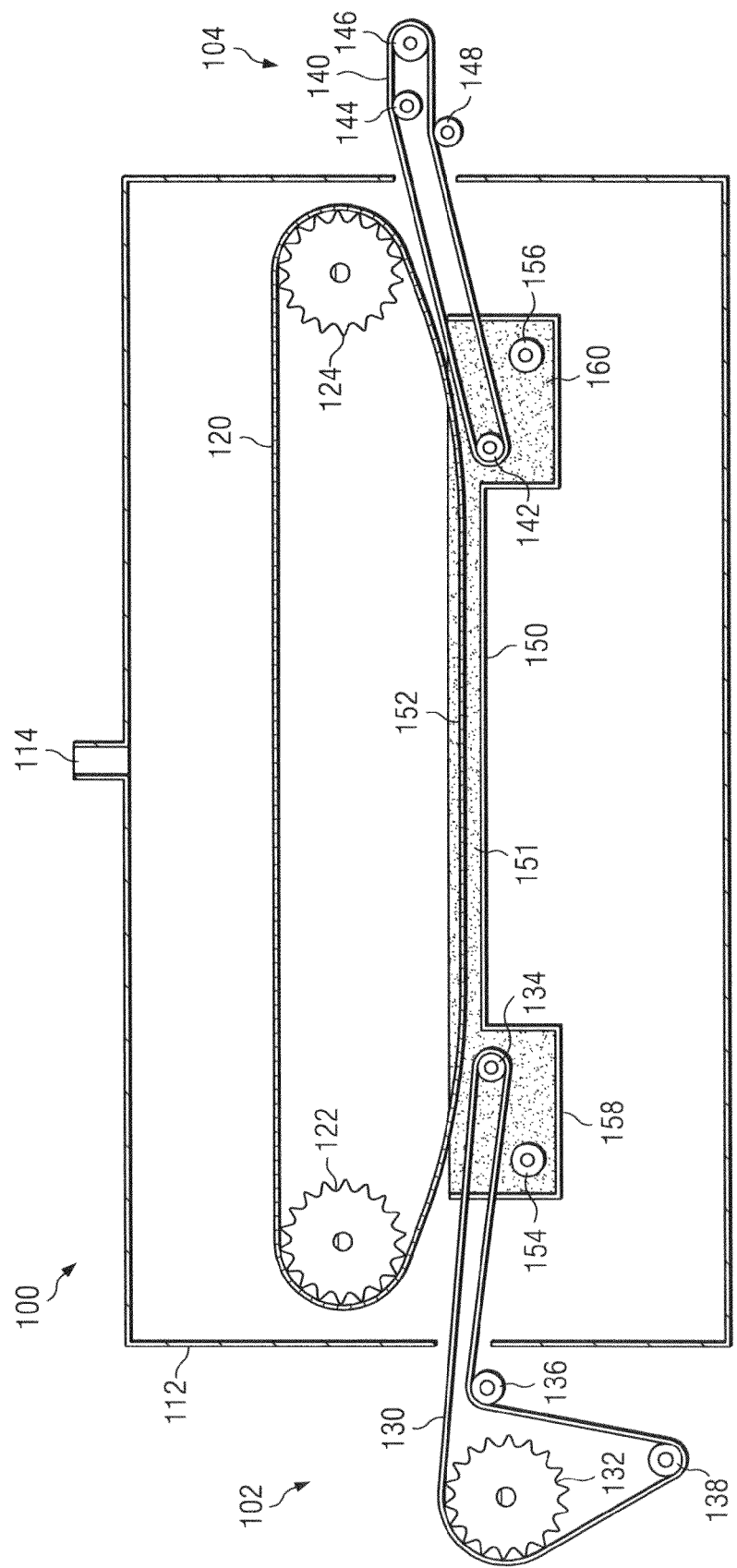
FIG. 2 is a schematic cross sectional view of a form fryer in accordance with the fryer disclosed in U.S. patent application Ser. No. 10/347,993.
Figure 3:
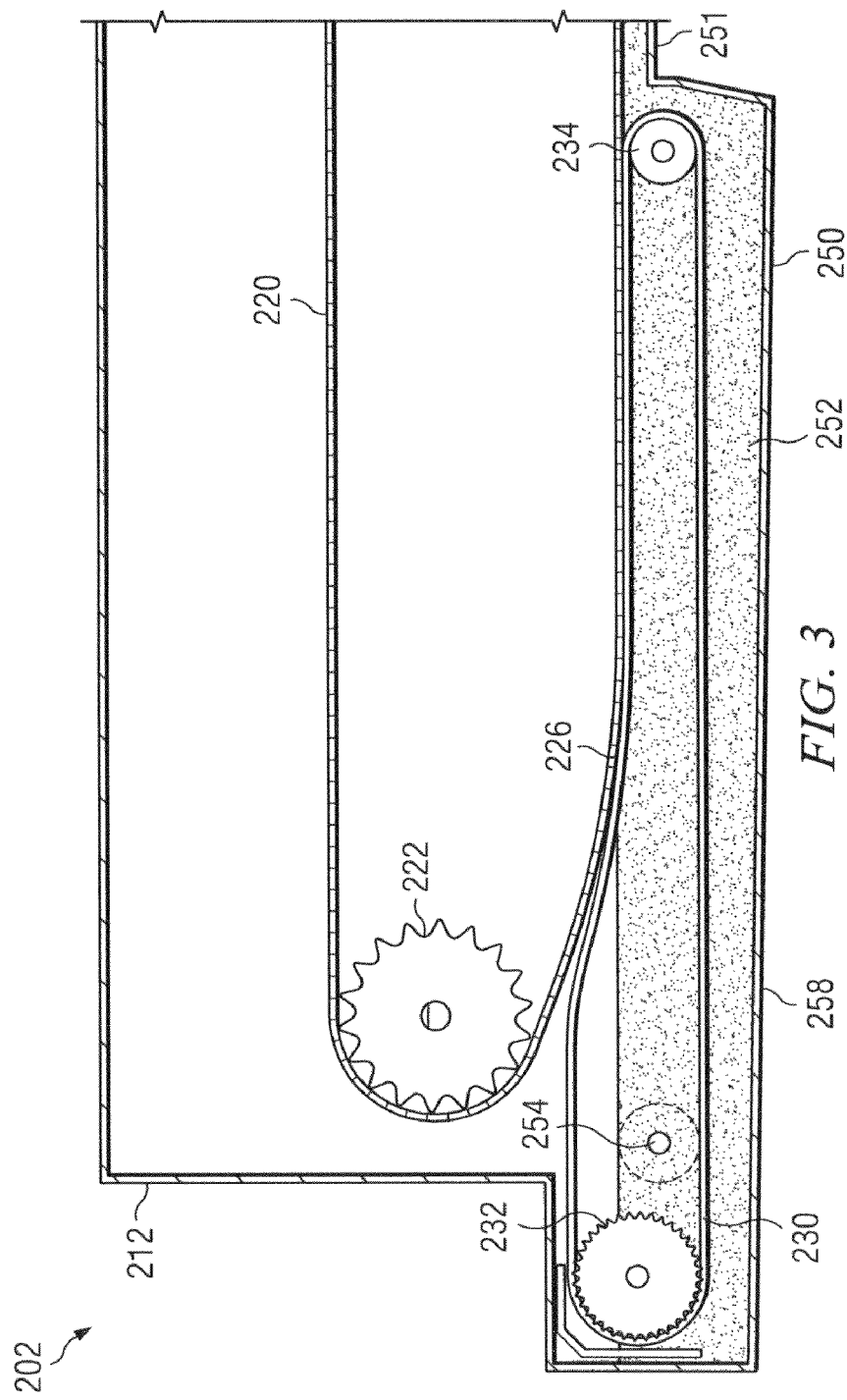
FIGS. 3-6 are schematic cross sectional views of form fryer entrance sections in accordance with the fryer disclosed in U.S. patent application Ser. No. 10/347,993 showing various configurations of bottom entrance conveyors.
Figure 4:
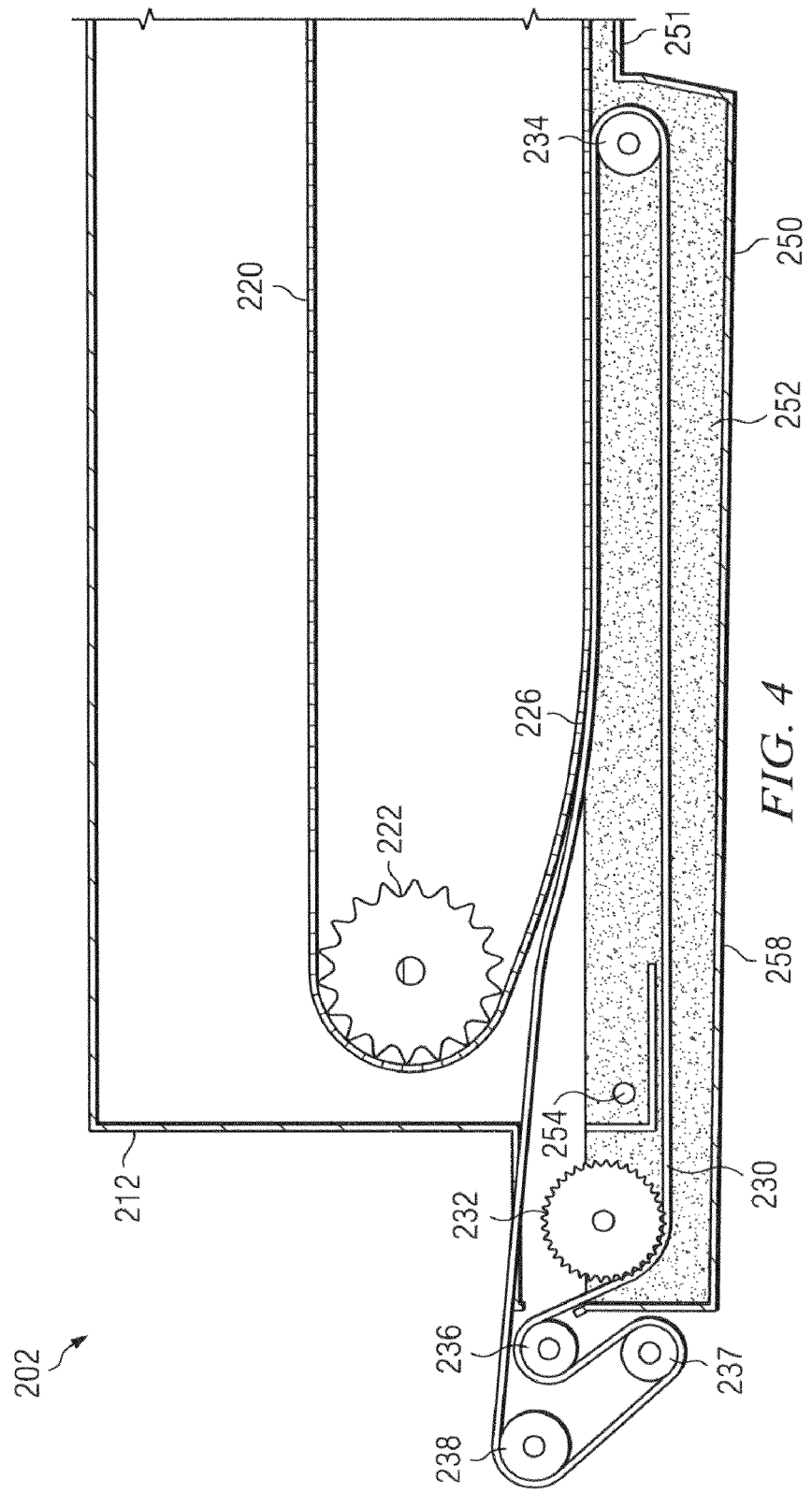
Figure 5:
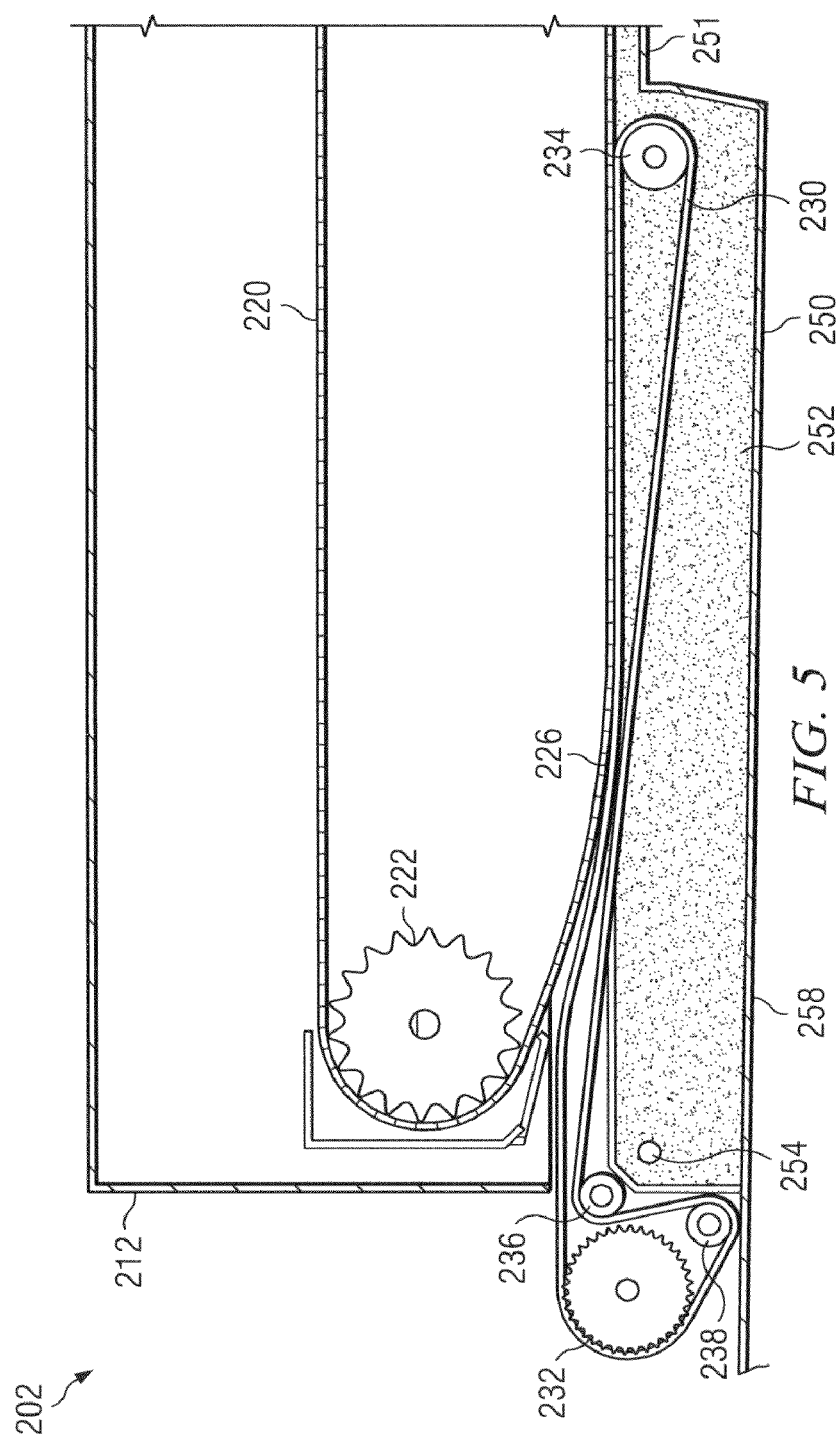
Figure 6:
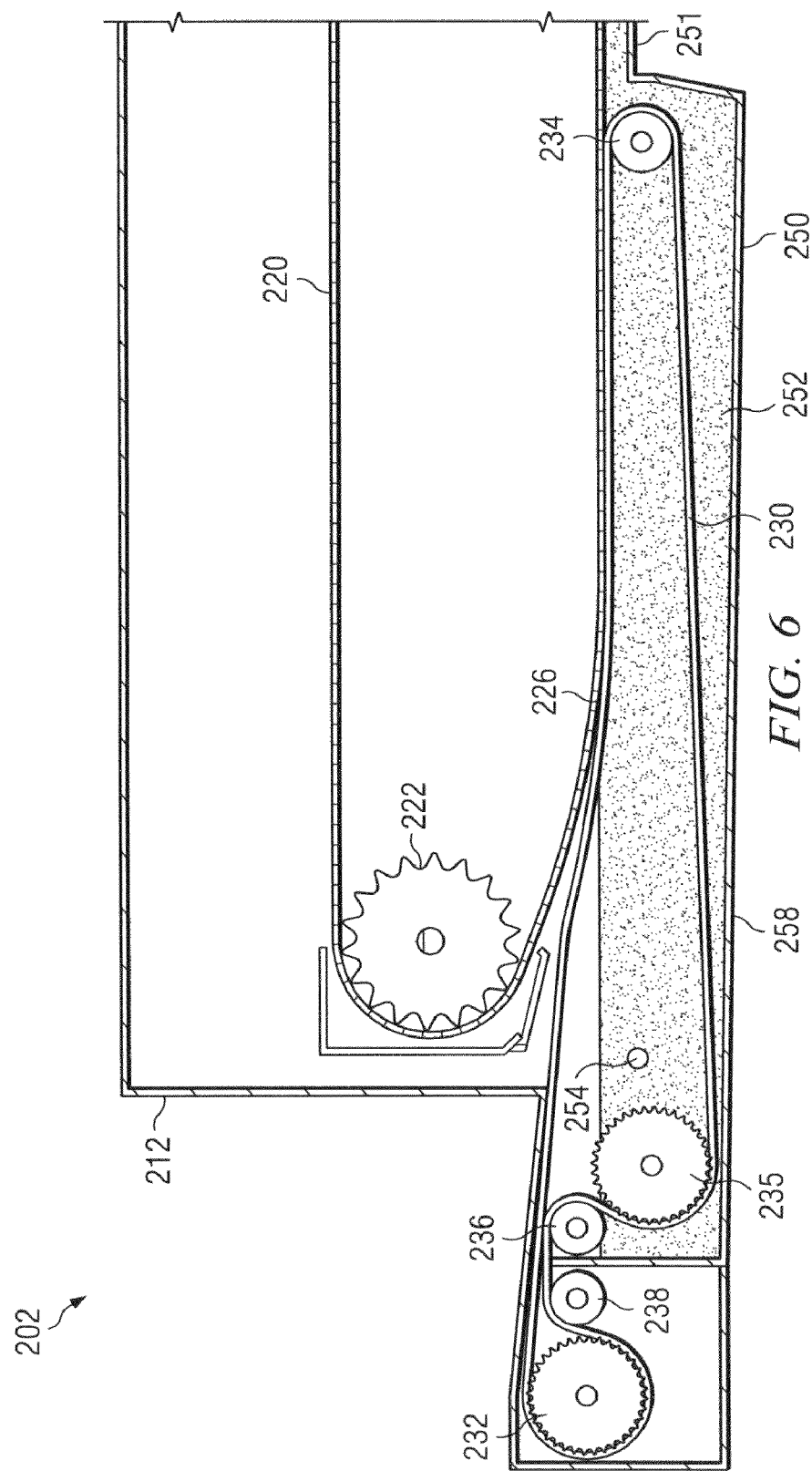
Figure 7:
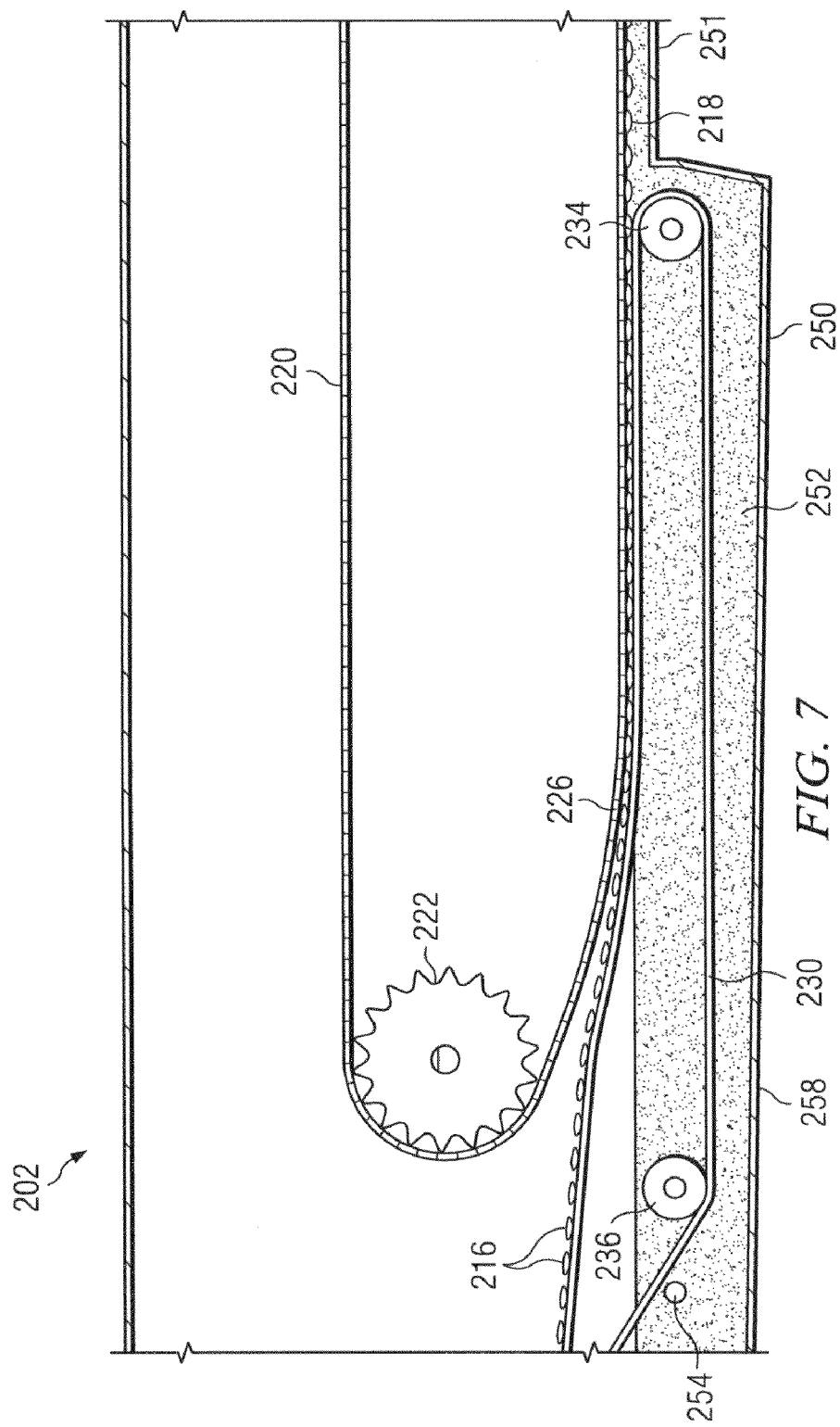
FIG. 7 is a partial schematic cross sectional view of an additional embodiment of a form fryer entrance section in accordance with FIGS. 3-6 showing snack pieces being fed into the fryer oil.
Figure 8:
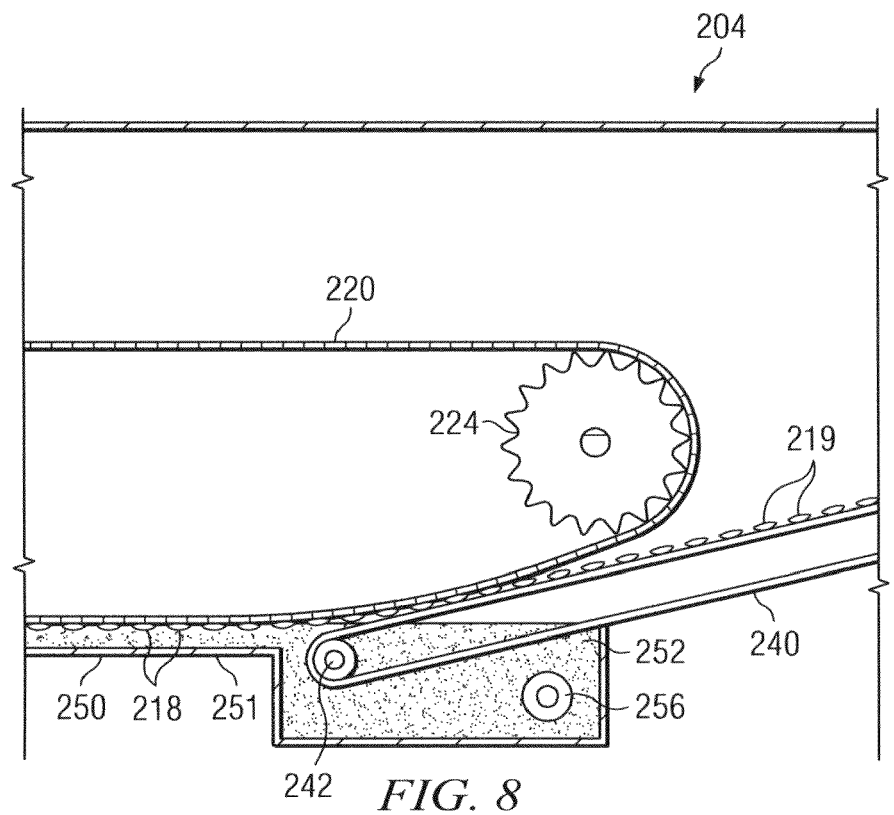
FIG. 8 is a schematic cross sectional view of a form fryer exit section in accordance with the fryer disclosed in U.S. patent application Ser. No. 10/347,993 that can be utilized with the fryer entrance sections of FIGS. 3-7 showing snack pieces being collected from the fryer oil.
Figure 9:
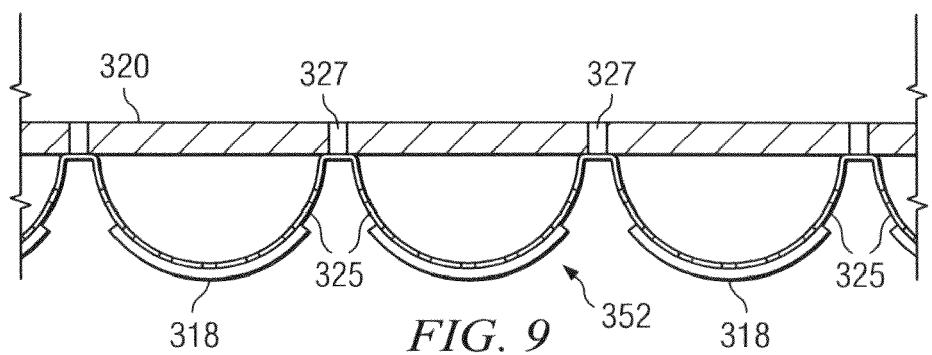
FIG. 9 is a partial cross sectional view of convexly shaped molds disposed on a top conveyor of a form fryer in accordance with the fryer disclosed in U.S. patent application Ser. No. 10/347,993.
Figure 10:
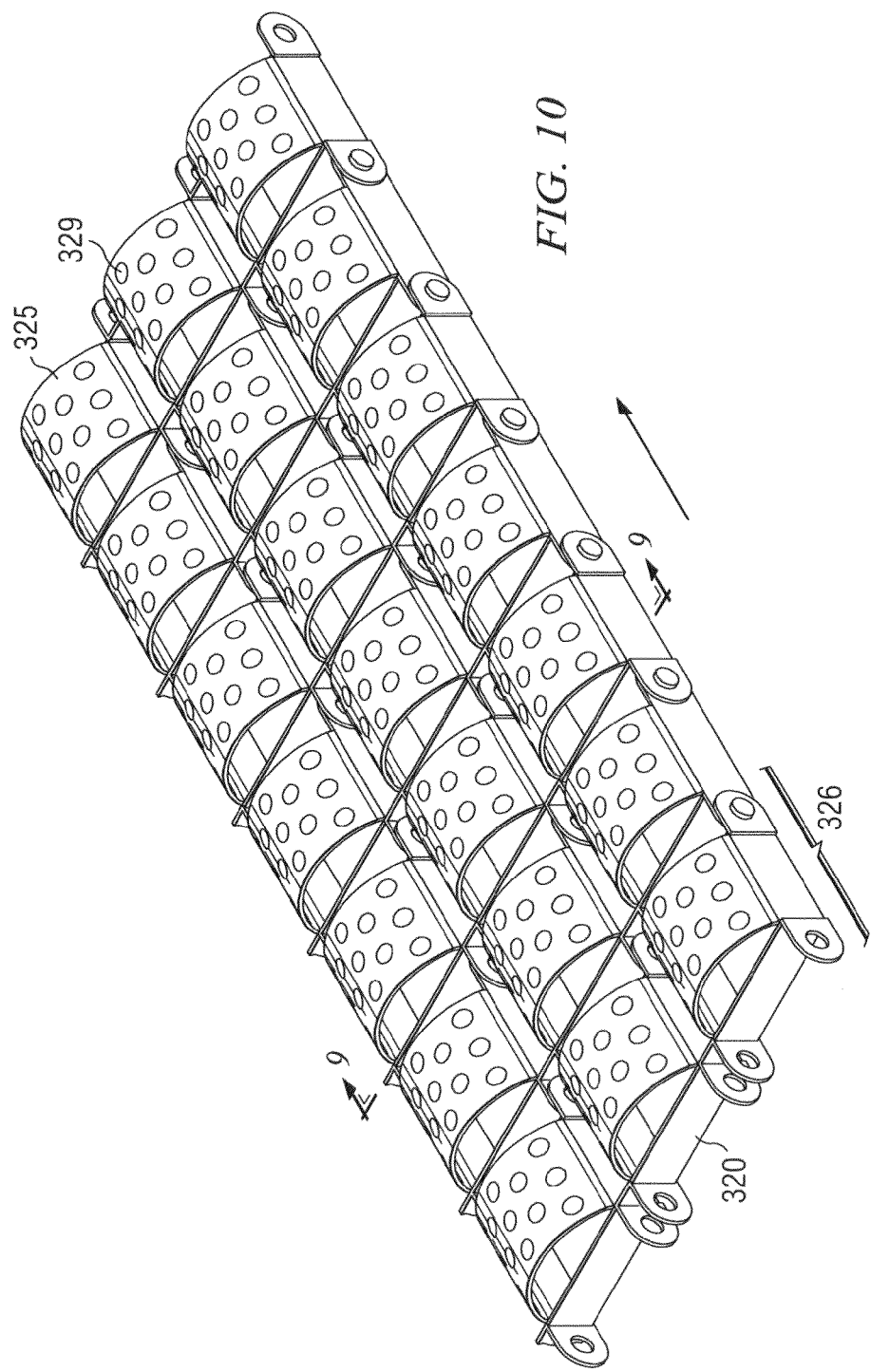
FIG. 10 is a partial top perspective view of molds disposed on the top conveyor of FIG. 9.
Figure 11:
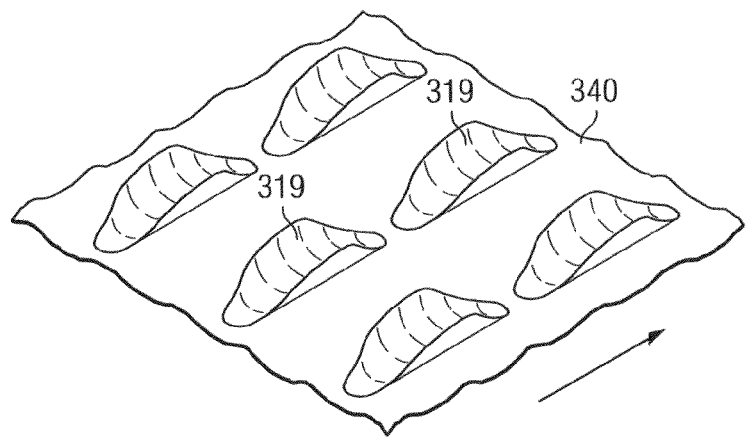
FIG. 11 is a partial top perspective view of concavely shaped snack pieces being conveyed on a bottom exit conveyor formed by the molds of FIGS. 9 and 10.
Figure 12:
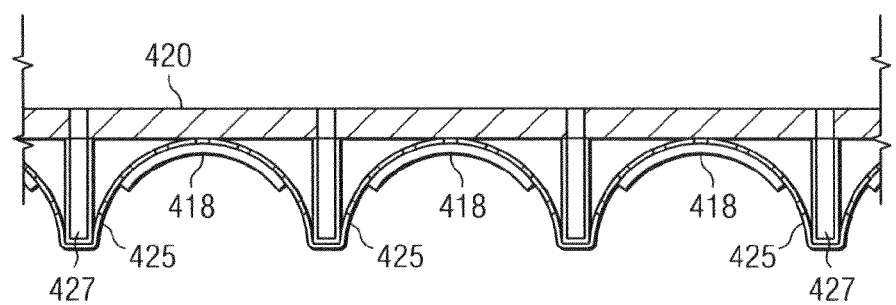
FIG. 12 is a partial cross sectional view of concavely shaped molds disposed on a top conveyor of a form fryer in accordance with the fryer disclosed in U.S. patent application Ser. No. 10/347,993.
Figure 14:
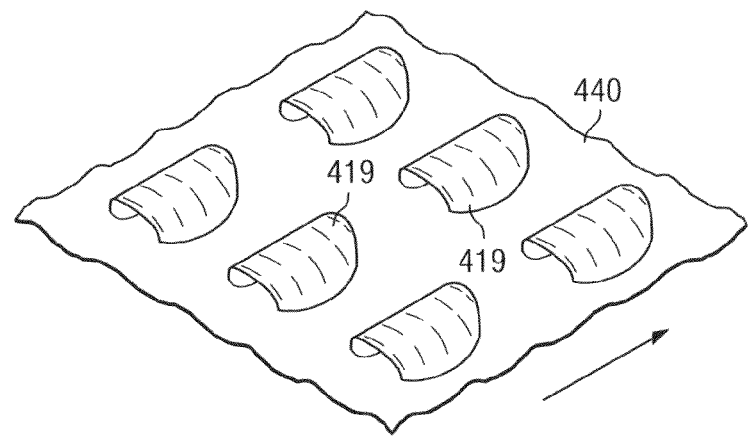
FIG. 14 is a partial top perspective view of convexly shaped snack pieces being conveyed on a bottom exit conveyor formed by the molds of FIGS. 12 and 13.
Figure 13:
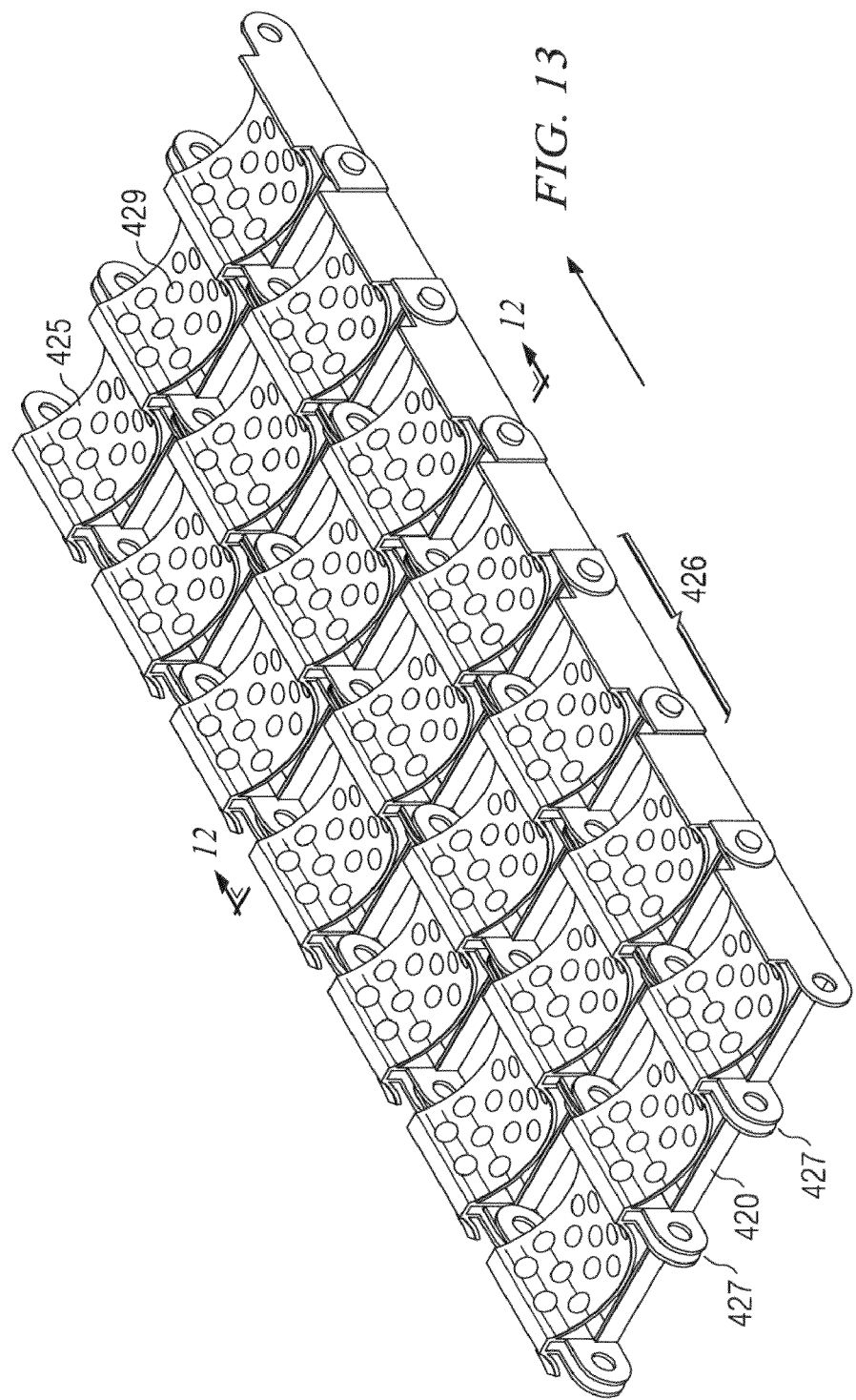
FIG. 13 is a partial top perspective view of molds disposed on the top conveyor of FIG. 12.
Figure 17A:
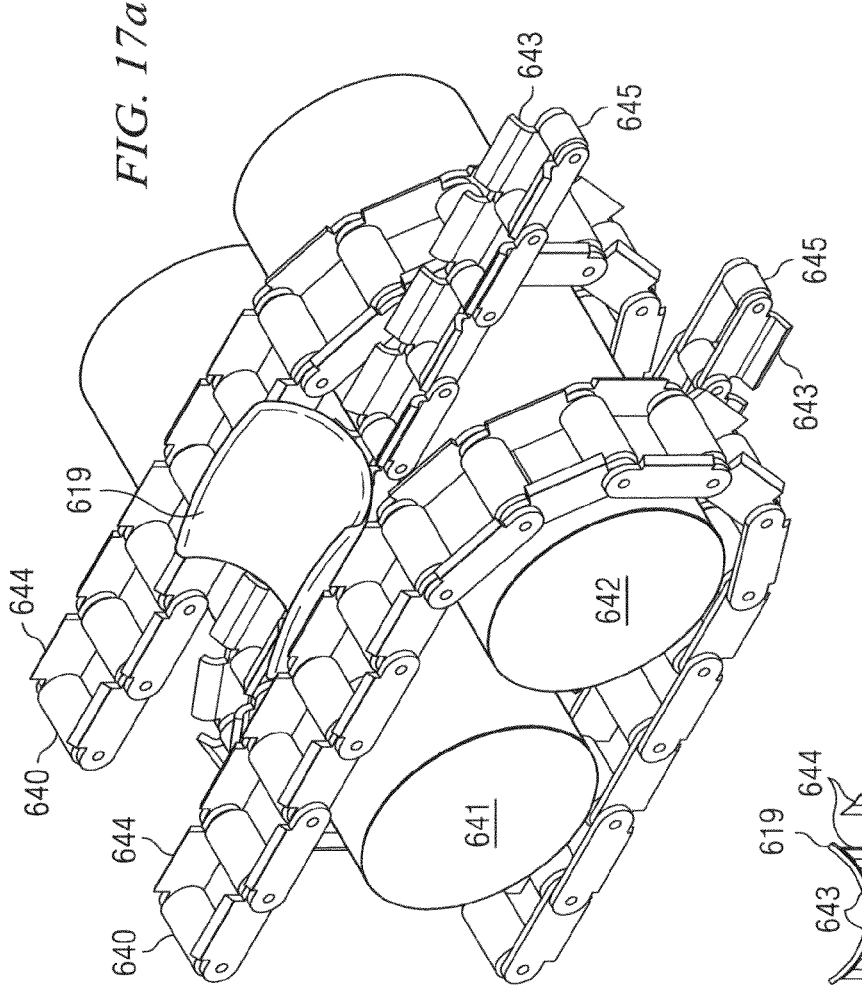
FIG. 17a is a top perspective view of concavely shaped snack pieces being conveyed along a pair of interlaced conveyors in accordance with the fryer disclosed in U.S. patent application Ser. No. 10/347,993.
Figure 17B:
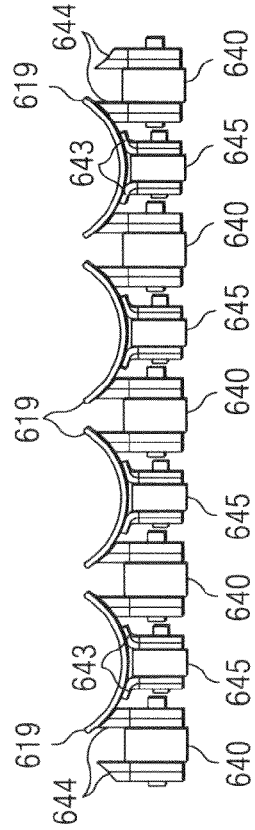

As explained above in the Background section, sparge steam is often introduced into an enclosed area above a fryer to displace oxygen, which undesirably oxidizes or degrades cooking oil. As used herein, sparge steam and steam are interchangeable and can include any inert gas. As used herein, an inert gas is defined as any gas that does not react with the product or the frying medium. Use of an inert gas such as sparge steam is particularly useful where the frying product does not produce enough steam to displace the air in the fryer. In addition to using sparge steam, losses due to oxidation/degradation of the oil can also be reduced by modifying the fryer itself. For example, when manufacturing molded, fried products, a prior art double-mold form fryer (two molding surfaces—top and bottom—for each product piece) can be replaced with a single-mold form fryer (one molding surface for each product piece) such as the single-mold form fryer disclosed in U.S. patent application Ser. No. 10/347,993. Reducing the number of mold surfaces helps reduce the amount of entrained oxygen drawn into the fryer along the mold conveyor. Such a form fryer also uses less frying oil, which must be replaced with fresh oil over time. Note that while the apparatus and optimization method of the present invention are discussed herein with respect to a single-mold form fryer, the apparatus and optimization method of the present invention are also of benefit to other fryers including, but not limited to: prior art form fryers, traditional deep fryers, and surface-floating fryers.

However, one undesirable consequence of using sparge steam is that steam may condense onto the lower-temperature dough pieces entering the fryer. Exposure to steam in the product-entry zone is known to cause several product defects, such as wrinkles, and other shape and/or surface deformities. In addition to affecting product quality, these defects can affect the product bulk density and interfere with the product's ability to stack and to be packaged efficiently should that be desired.

The inventors have discovered that one solution to this problem is to place a steam shield at or near the entrance of the fryer. As used herein, a steam shield is a physical boundary which extends the width of the fryer housing and from a point close to the surface of the oil in the pan to a point above the entering product at the entry to the fryer. The purpose of this steam shield is to create a protected vestibule area at the front product entry portion of the fryer to enable the creation of a separate and different atmosphere from that on the outside of the vestibule. Any structure that achieves this purpose can be used, including a series of baffles. Such a steam shield helps prevent steam from contacting the entering dough pieces. While this reduces the occurrence of condensate-related defects, small amounts of steam can still enter the fryer through gaps in the steam shield, and the conveyor belt (or belts) and product pieces entering the fryer can also pull oxygen from the ambient air into the fryer. Because the steam shield keeps sparge or product steam away from the entrance of the fryer, there is a need for a different mechanism for displacing oxygen at the fryer entrance.

The inventors have discovered a solution to this displacement problem. In addition to a steam shield at or near the entrance of the fryer, the fryer front end can also comprise a vestibule enclosing, as much as possible, the entrance of the fryer up to the steam shield. An inert gas manifold having at least one nozzle or port can be positioned within this vestibule to fill and continuously replenish the vestibule with a non-condensing inert gas, thereby displacing both oxygen and steam. As used herein, a non-condensing inert gas is any gas that will not condense on product entering the frying medium nor will it react with the product or frying medium under process conditions. The non-condensing inert gas can comprise, but is not limited to, nitrogen, argon, carbon dioxide, and helium. In one embodiment, the manifold produces a relatively uniform flow of a non-condensing inert gas across a vestibule opening. In one embodiment, the uniform flow of non-condensing inert gas is produced by a plurality of nozzles. In an alternative embodiment, the uniform flow of non-condensing inert gas is produced by a continuous slit in the manifold. The above are provided as examples of ways to satisfy the objective of flushing the vestibule opening with a non-condensing inert gas to prevent a condensing inert gas such as steam from entering the vestibule. This solution allows operators of the fryer to break free from the balancing problem between oxygen displacement (using sparge steam) and product defects (due to condensation). An extended hood can also be placed in front of the fryer entrance to further protect the fryer entrance from the ambient air. Such an extended hood may or may not have an inert-gas manifold.

The inventors further discovered, however, that simply filling the vestibule (and extended hood, if present) with a non-condensing inert gas may not be enough. The precise place of introduction and direction of non-condensing inert gas flow substantially affects the system's ability to prevent oxygen from entering the fryer hood, as well as its ability to prevent sparge steam from passing through gaps in the steam shield and from being pumped in by the moving mold conveyor into the fryer front-end vestibule. In a preferred embodiment, the front end of the fryer housing has a steam shield that separates the front portions of the fryer housing from the rest of the enclosed fryer volume. The steam shield has an opening through which the mold conveyor can pass. While ideally the conveyor opening can be just large enough for the conveyor to pass, the opening can also be slightly larger than the conveyor for safety reasons. The steam shield within an industrial-sized fryer preferably comprises a vestibule opening having a gap of less than 1-inch, more preferably less than about ½ inch and most preferably about ¼-inch around the conveyor so that the conveyor will not contact the steam shield. In one embodiment, the steam shield is configured such that the gap between the mold conveyor and the steam shield is uniform. Several nozzles for introducing non-condensable inert gas can be positioned at, and angled in, various positions. Some can be positioned to deter steam from being pumped into the protected product entry environment, while others can be positioned to prevent outside air from entering the fryer along with the incoming product. This promotes a low steam and low oxygen front-end vestibule where dough pieces can enter the frying oil without carrying excess surface condensate or oxygen into the frying oil.

Figure 18:
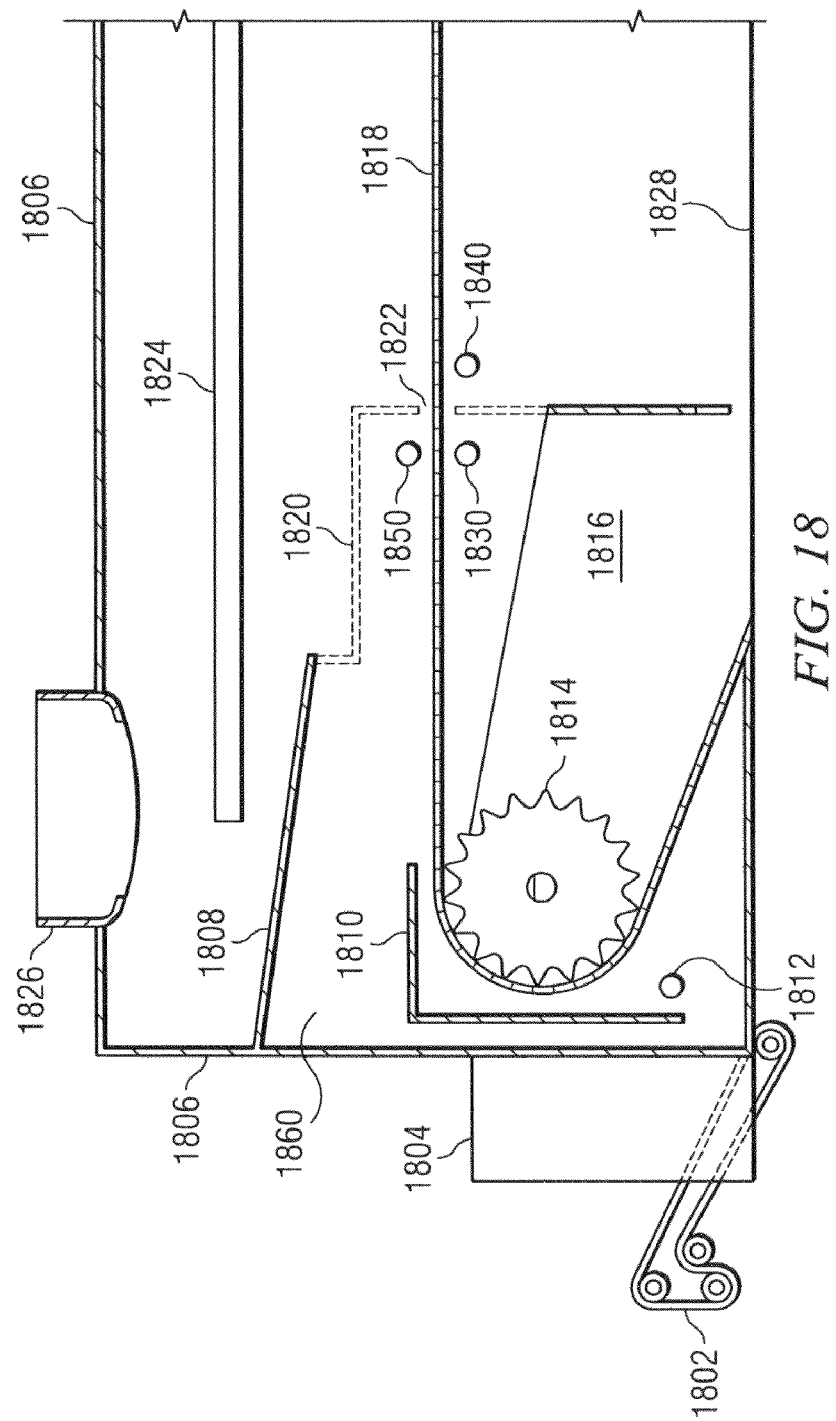
FIG. 18 is a schematic cross-sectional view of the front end of a fryer having a steam shield and nitrogen injection points of a preferred embodiment of the invention disclosed.

FIG. 18 is a schematic cross-sectional view of the front end of a fryer in a preferred embodiment. The fryer has a steam header 1824 for introducing sparge steam into the main portion of the fryer housing 1806. A drip shield 1808 helps prevent condensate from dripping onto product as it enters the fryer. An exhaust stack 1826 draws steam out of the fryer housing 1806 for recycling and reheating. According to the modifications of the present invention, the fryer also has a steam shield 1820 and several nitrogen injection manifolds 1812, 1830, 1840, 1850. Stainless steel or any other food grade material can be used for the front-end vestibule 1860 and steam shield 1820. In one embodiment, the fryer front end has nitrogen manifolds in at least three general locations: 1) an injection manifold 1812 located underneath the mold conveyor 1814 (which is supported by a mold conveyor side support 1816 and a mold conveyor support frame 1810) near the front and close to the product entry belt, with the injection manifold 1812 having a plurality of nozzles along the width of the fryer with the non-condensing inert gas flowing down and slightly toward the front of the fryer (e.g. such that an inert gas port(s) direct non-condensable inert gas upstream and downward so as to block the entry of undesired gases from the product entry point); 2) an injection manifold 1850 above and an injection manifold 1830 below the mold-conveyor gap 1822 on the non-condensing inert-gas-side/upstream-side of the steam shield 1820, with each injection manifold 1830 1850 having a plurality of nozzles along the width of the fryer with the non-condensing inert gas flowing toward the mold-conveyor gap 1822 at specified angles relative to the shield and mold conveyor; and 3) an injection manifold 1840 near the mold-conveyor gap 1822 on the steam-side/downstream-side of the steam shield 1820, with the injection manifold 1840 having a plurality of nozzles along the width of the fryer with the gas flowing roughly across the gap 1822. This embodiment efficiently provides a curtain of non-condensing inert gas to prevent steam from entering the vestibule 1860. Note, however, that other embodiments can have fewer or greater numbers of non-condensing inert gas introduction points, depending on the desired degree of oxygen and steam shielding. While the positions of gas manifolds have been described with respect to a preferred embodiment, the positions and number of gas manifolds can also change depending on other factors including, but not limited to, the type of fryer used.

It should be noted that in alternative embodiments, the vestibule opening 1822 can use a non-gaseous, mechanical seal to aid in maintenance of a separate and different atmosphere within the vestibule 1860. For example, in embodiment, a brush can be placed along a portion of the entire width of the vestibule opening 1822.

Several variables, including cost, can be optimized by using computation fluid dynamic (CFD) modeling to determine an efficient way in which to produce a gaseous seal at the vestibule opening 1822 including, but not limited to, ways of reducing the amount and therefore the cost of non-condensing inert gas required to effect a desired seal and/or desired levels of oxygen and non-condensing gases in the vestibule 1860. For example, a higher pressure could simply be provided in the vestibule 1860 by pumping sufficient quantities of non-condensing inert gas into the vestibule at higher pressure to force flow from the vestibule 1860 through the opening 1822 and thereby prevent condensing gases from entering the vestibule 1860 from the opening 1822. Alternatively, the entire fryer hood could be filled with non-condensable inert gas. However, such options may be more expensive than desired and/or may introduce potential safety issues. Consequently, the design and optimization method described below can be used to determine the optimal location, number, and direction of non condensing inert gas manifolds in other embodiments.

Optimization Method

In a preferred embodiment, CFD (Computational Fluid Dynamics) modeling is used to determine the optimal placement and positioning of the steam shield, baffles, and non-condensing inert-gas nozzles. From an efficiency standpoint, mere introduction of non-condensable inert gas into a separate front-end vestibule is not enough. Placement and positioning are also very important, as the inventors have found that improper placement can cause the front-end vestibule to fail in its purpose of creating a sufficiently low oxygen and sufficiently low condensable gas or steam environment. As used herein, a sufficiently low oxygen environment preferably has less than about 5% oxygen by weight, more preferably less than about 1% oxygen and most preferably less than about 0.5% oxygen. As used herein, a sufficiently low condensable gas environment comprises a gas that, under process conditions, is preferably more than about 1 degree Fahrenheit above its dewpoint, more preferably more than about 10 degrees Fahrenheit above its dewpoint and most preferably more than about 20 degrees Fahrenheit above its dewpoint. In some cases, improper placement of non condensable inert-gas nozzles can even worsen oil degradation.

The method for designing and optimizing the atmosphere control in a continuous fryer having a steam-shielded front-end vestibule of the present invention comprises the following general steps:

a) begin with a continuous, enclosed fryer having a fryer hood for controlling the atmosphere above the oil;
 b) conduct measurements of the oxygen and steam concentrations at the critical points in the environment, if possible, for future comparison with predetermined environmental objectives (i.e. below a certain oxygen level, or below a certain oil degradation);
 c) create a CFD model of the front end environment: include desired environment properties such as temperatures, initial gas concentrations, volumes, physical boundaries, flows, pressures, moving boundaries, etc.;

d) conduct dynamic simulations of the process system: identify resultant environment properties such as gas concentrations, temperatures, pressures, and flows;

e) as a baseline for future comparison, measure or identify, through CFD simulation, the effectiveness of the system in reducing oxygen concentration, particularly at the oil surface, as well as the effectiveness in reducing condensable gas or dewpoint in the product entry area;

f) identify any areas of opportunity for further optimization of the desired environmental objectives;

g) modify the fryer model by adding a steam shield to create a separate front-end section (or "vestibule"), thereby substantially enclosing the area around the product submerging point; add the minimum number of non-condensable inert gas manifolds, and nozzles (or other non-condensable gas distribution methods) believed to be necessary to obtain the stated objectives.

h) conduct designed experiments, parametric studies, with variables that can affect the vestibule environment through CFD simulation;

i) through simulation, measure the effectiveness of the modified fryer system in reducing oxygen and steam in the vestibule environment while minimizing the non-condensable inert gas usage;

j) identify trouble spots in the fryer system, if any, where oxygen concentrations and/or steam concentrations are at undesirable levels or inert gas usage is not minimized;

k) modify the fryer model at the trouble spots by: changing the flow rate of the gas feeds (inert gas and/or steam), changing the direction of the gas feeds (inert gas and/or steam), changing the steam shield position and/or design, changing the stack dampers and/or fans to optimize steam removal from the fryer environment, or modifying the number of inert-gas manifolds; and l) repeat steps i) through k)—i.e. measure effectiveness, identify trouble spots, and modify the fryer model—until acceptable concentrations of oxygen and steam are achieved at a minimum inert gas usage level.

This process could also be done with a physical fryer model or production fryer system as well, but would be much less efficient.

FIGS. 19 through 24 are color concentration plots and/or particle traces showing the levels of nitrogen, oxygen, and steam, which were measured in accordance with one embodiment of the optimization method enumerated above. In each one of the FIGS. 19 through 24, the concentration levels are represented by color, where red (at the top of the color spectrum) represents relatively higher concentrations, and violet (at the bottom of the color spectrum) represents 0%. With respect to nitrogen concentrations, the represented range is 100% to 0%, from red to violet. With respect to steam concentrations, the represented range is 100% to 0%, from red to violet. With respect to oxygen concentrations, the represented range is 5% to 0%, from red to violet.

In practicing a preferred embodiment of the method, the inventors began with a continuous, single-mold form fryer, such as the one discussed above with respect to U.S. patent application Ser. No. 10/347,993, in accordance with step a). In step b), oxygen and steam concentrations are measured throughout the fryer front end. In step c), this information is used in combination with other environment properties—such as temperatures, volumes, physical boundaries, flow rates, pressures, and moving boundaries—to create a computation fluid dynamics (CFD) model of the front end environment. Then, in step d), dynamic simulations of the process system are conducted and compared to actual field test data to hone the system model. After repeated dynamic simulations, comparisons to actual test data, and adjustments to the model, the CFD model is able to predict the behavior (i.e. the resultant environment properties) of the fryer front end to an acceptable degree of accuracy. In step e), as a baseline for future comparison, the CFD model is used to measure/predict the effectiveness of the system in reducing oxygen concentration—particularly at the oil surface, as well as the effectiveness in reducing steam in the product entry area.

Figure 19:
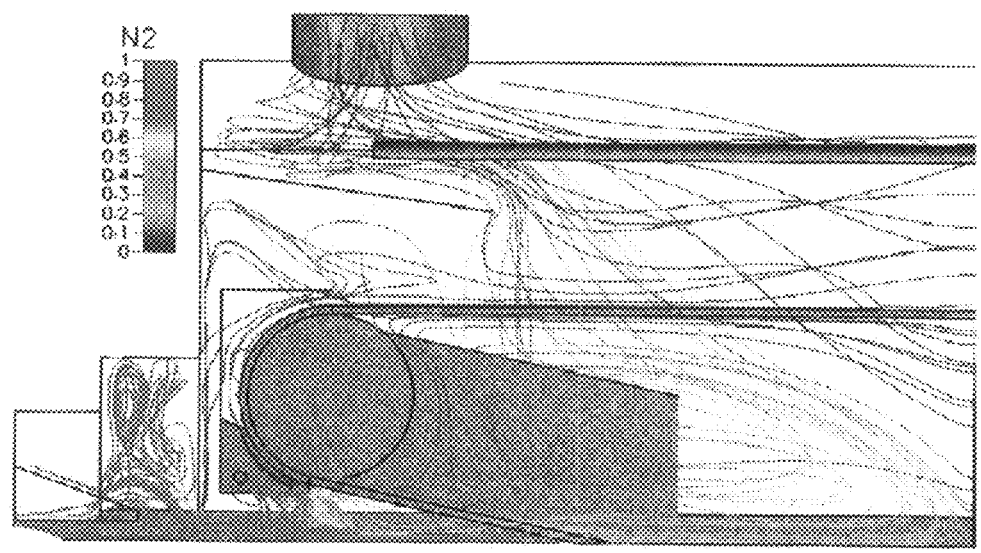
FIG. 19 shows a nitrogen particle trace in a schematic cross-sectional view of the fryer front end in a baseline case.
Figure 20:
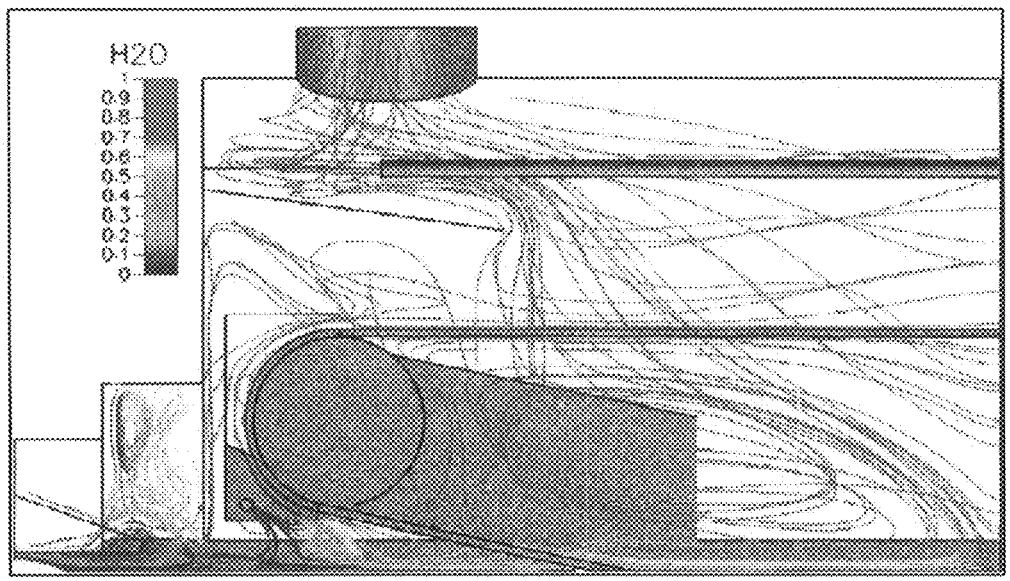
FIG. 20 shows a steam particle trace in a schematic cross-sectional view of the fryer front end in a baseline case.
Figure 21:
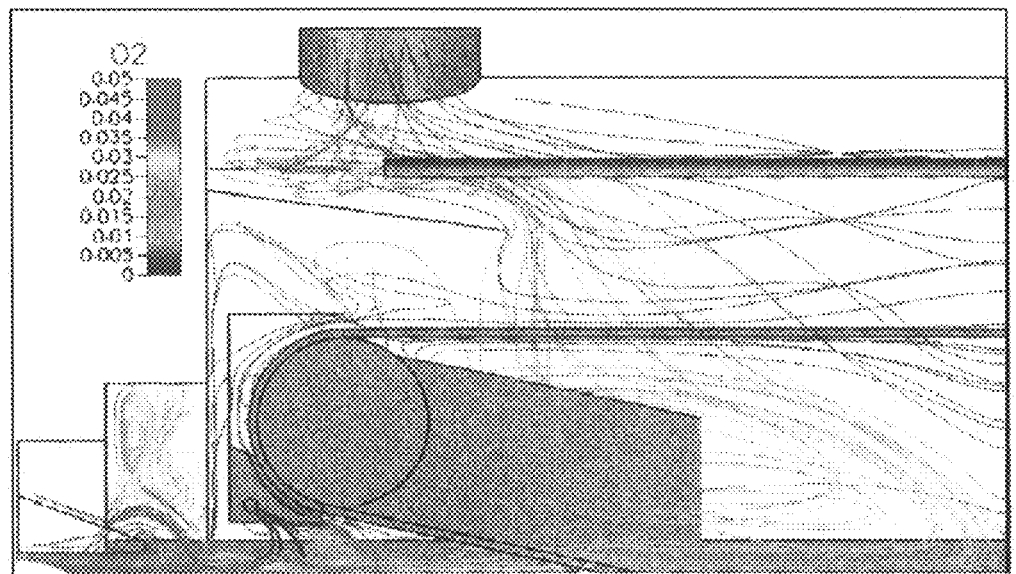
FIG. 21 shows an oxygen particle trace in a schematic cross-sectional view of the fryer front end in a baseline case.

FIGS. 19 through 21 illustrate the results of steps f) through i) of the method of the present invention. Note, however, that the apparatus and method of optimizing fryer atmosphere control also can be used with other fryer systems. Returning to the preferred embodiment, in particular: FIG. 19 shows a nitrogen particle trace in a schematic cross-sectional view of the fryer front end in a baseline case; FIG. 20 shows a steam particle trace in a schematic cross-sectional view of the fryer front end in a baseline case; and FIG. 21 shows an oxygen particle trace in a schematic cross-sectional view of the fryer front end in a baseline case. In accordance with steps f) and g) of the method, a single nitrogen manifold was positioned under the mold conveyor and near the product submerging point (where the product meets the mold conveyor and is forced down into the frying oil). The nitrogen manifold is shown in FIGS. 19-21 and is akin to the one shown in FIG. 18. The nitrogen manifold nozzles were initially directed at a downward angle downstream toward the product submerging point, as that was hypothesized to be the most advantageous arrangement. In accordance with step h) and i) of the method, the particle traces and concentration levels of nitrogen, oxygen, and steam were measured to establish baseline data.

As can be seen in the figures, the nitrogen flow shown in FIG. 19 was at its highest concentration as it flowed at a downward angle out from the nitrogen manifold, as expected. Some of the nitrogen flowed into the extended hood and merely circulated around the top portion of the extended hood, which then forced some of the nitrogen flow to pass through the bottom portion of the extended hood without circulating. Nitrogen in the internal portion of the fryer circulated and eventually exited the fryer either downstream or out the fryer exhaust at the top of the fryer housing.

Although it was initially theorized that it would be most effective to direct nitrogen at a downward angle towards the product submerging point, FIG. 20 shows that the nitrogen flow actually pulled surrounding steam along with it to the product submerging point. In fact, the steam comprised roughly 50% by mass of the gas surrounding the product entry point. The relatively stagnant nitrogen in the extended hood also caused a small amount of steam to directly bypass the extended hood and travel upstream and directly onto the product feeding into the fryer. Likewise, FIG. 21 shows that the nitrogen flow from the initial nitrogen manifold arrangement actually pulled oxygen along its stream to the product submerging point.

In performing method steps h) and i), the inventors conducted the following case studies:

| Case | Total N2 into Hood/Frame (m³/hr) | Steam (kg/hr) | Shield Gap (inches) |
|---|---|---|---|
| 1 | 190 | 1000 | ¼ |
| 2 | 270 | 800 | ½ |
| 3 | 190 | 600 | 1 |
| 4 | 350 | 1000 | 1 |
| 5 | 350 | 600 | 1 |
| 6 | 270 | 1000 | No shield |
| 7 | 270 | 600 | No shield |

| Case | Total N2 into Hood/Frame (m³/hr) | Steam (kg/hr) | Shield Gap (inches) |
|---|---|---|---|
| 8 | 270 | 800 | No shield |
| 9 | 270 | 800 | ¼ |

Figure 22:
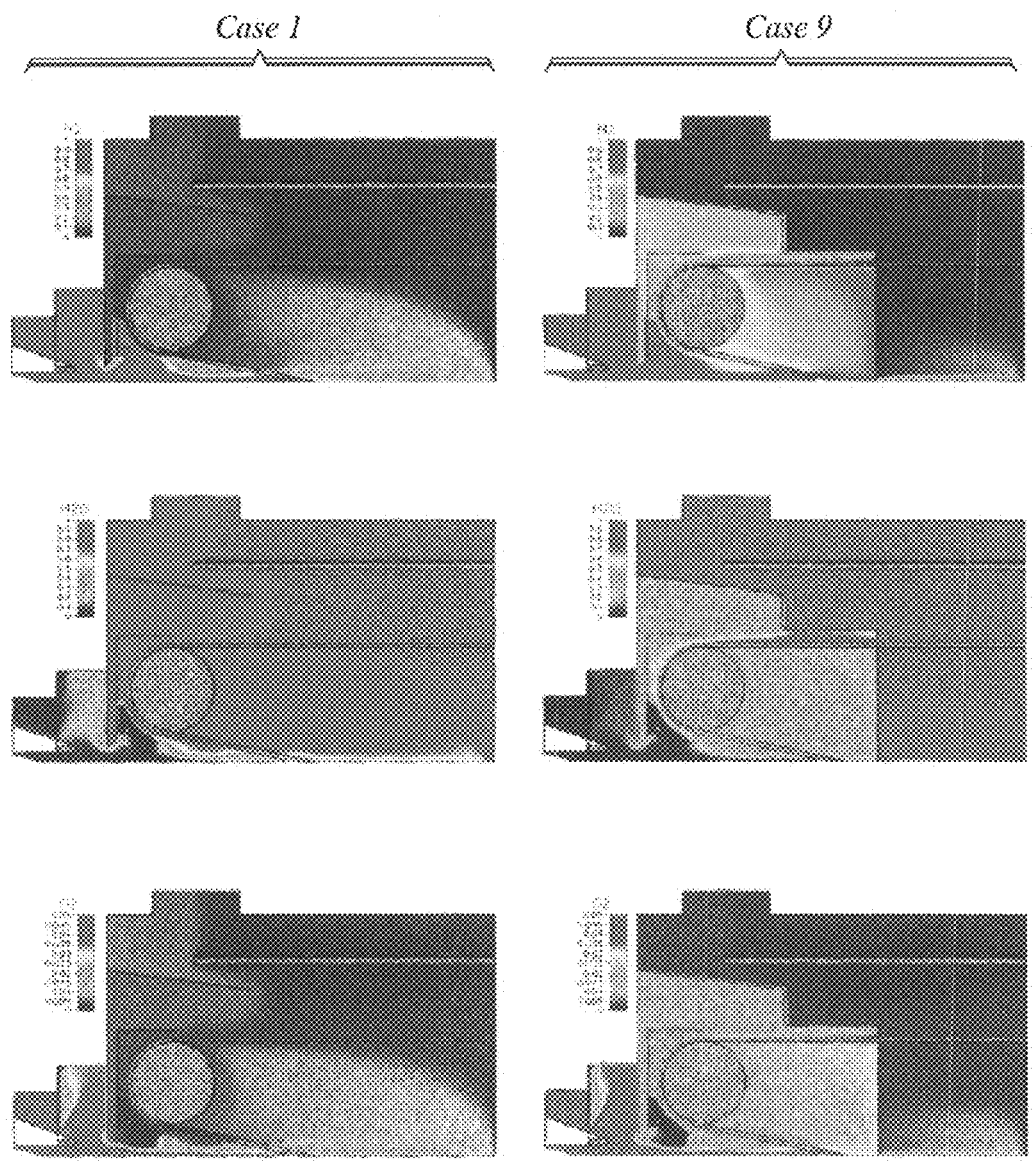
FIG. 22 is a comparison of Case 8 (no steam shield) versus Case 9 (steam shield in place) concentration gradients of nitrogen, oxygen, and steam in a fryer front end.
Figure 23:
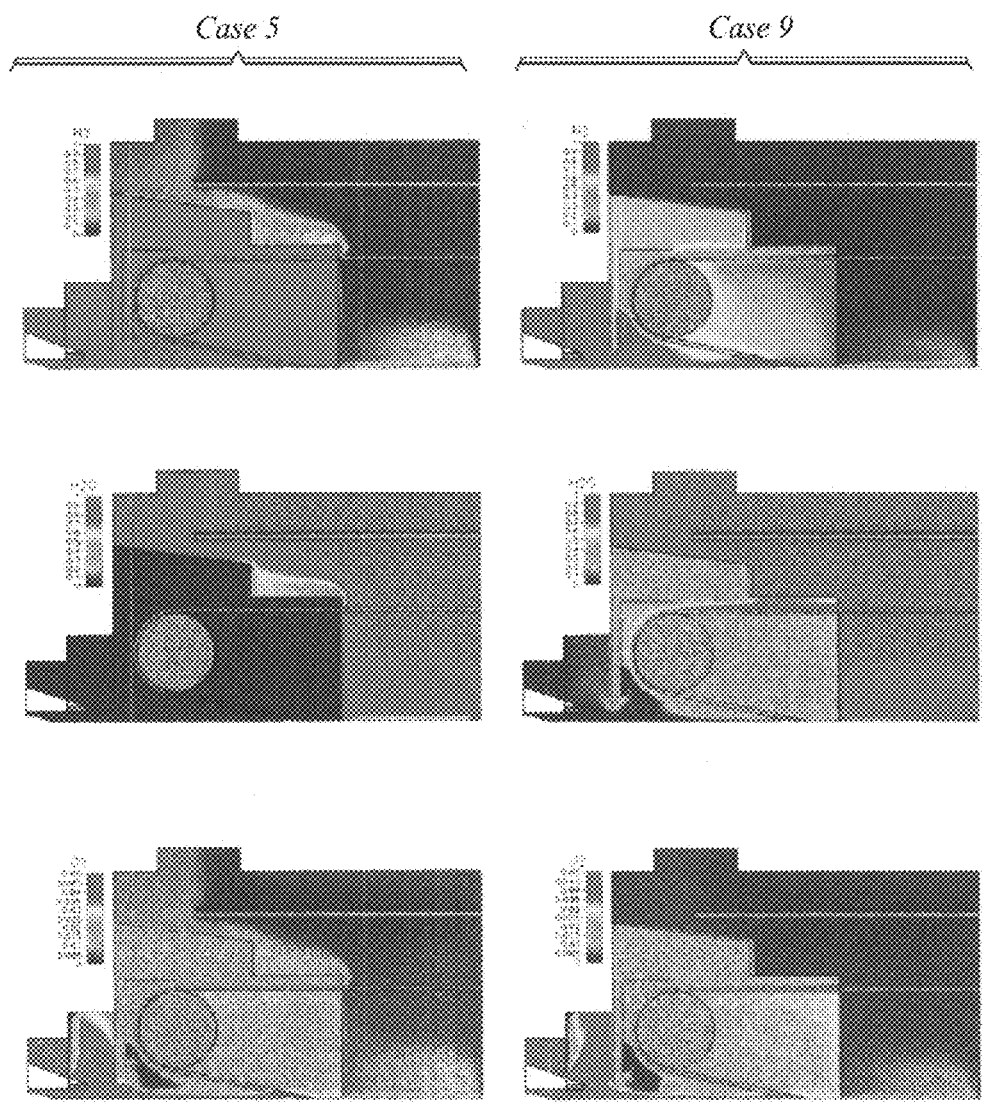
FIG. 23 is a comparison of Case 5 (high nitrogen, low steam) versus Case 9 (medium nitrogen, medium steam) concentration gradients of nitrogen, oxygen, and steam in a fryer front end.
Figure 24:
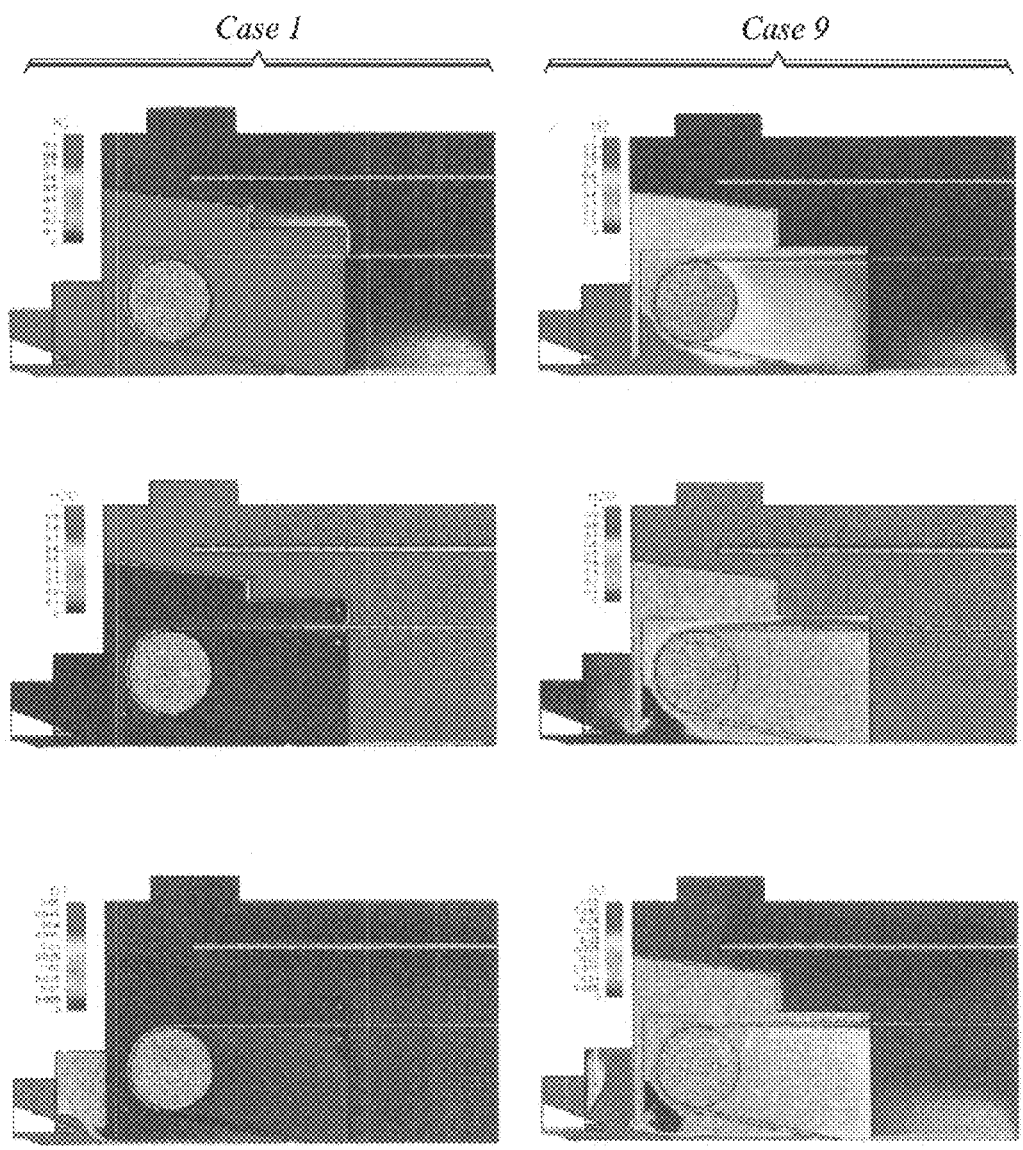
FIG. 24 is a comparison of Case 1 (modified vestibule design) versus Case 9 (initial vestibule design) concentration gradients of nitrogen, oxygen, and steam in a fryer front end.

FIGS. 22 through 24 show several comparative results of method steps h) and i). FIG. 22 is a comparison of Case 8 (no steam shield) versus Case 9 (steam shield in place) concentration gradients of nitrogen, oxygen, and steam in a fryer front end. Case 9 results were obtained after the inventors modified the fryer housing, in accordance with method step d), by adding a steam shield spanning the entire cross-sectional area of the fryer. The steam shield is generally transverse to the length of the fryer. The steam shield is made from a thin sheet of stainless steel in the preferred embodiment, but other food-grade, heat-resistant, non-pervious corrosion-resistant materials can be substituted. In one embodiment, an opening in the steam shield allows the mold conveyor to pass through the steam shield, and a small gap between the conveyor and steam shield can be maintained to prevent contact between the two. In performing step i) of the method, the inventors measured concentration levels of nitrogen, oxygen, and steam in the steam-shielded front-end of the fryer, the results of which are shown in Case 9, FIG. 22. In Cases 8 and 9, 270 m³/hr nitrogen ("medium nitrogen flow") and 800 kg/hr steam ("medium steam flow") were supplied to the fryer hood. The only difference between the two cases was the presence of a steam shield (Case 9) or lack thereof (Case 8).

In step j) of the method, which involves identifying trouble spots, the inventors noted that while the steam shield did significantly reduce the amount of steam present in the fryer front-end (reducing the general steam concentration from at least 80% to roughly 50%), there was still a significant amount of steam at the product submerging point—roughly 50%. Moreover, the lack of steam in the fryer front-end (the vestibule, in particular) allowed more oxygen to occupy the space, and the nitrogen flow was not enough to substantially displace the oxygen from the front-end. The oxygen levels were still as high as about 4% at the product submerging point. Oxygen from the ambient air appeared to follow along the surface of the oil and entering product, slipping under the blanket of nitrogen within the vestibule. The inventors also noted that significant amounts of steam leaked through the mold-conveyor opening of the steam shield.

FIG. 23 is a comparison of Case 5 (high nitrogen, low steam) versus Case 9 (medium nitrogen, medium steam) concentration gradients of nitrogen, oxygen, and steam in a fryer front end. The left-hand column shows Case 5 results, and the right-hand column shows Case 9 results. As can be seen in the figure, increasing the steam flow and decreasing the nitrogen flow (moving from Case 5 to Case 9) causes the nitrogen levels in the vestibule to decrease, causes the steam levels in the vestibule to increase, and has little to no effect on the oxygen levels in the vestibule. When the opposite is done (moving from Case 9 to case 5)—decreasing steam flow and increasing nitrogen flow—the vestibule sees higher nitrogen levels, lower steam levels, and little to no change in oxygen levels. More importantly, the results show that in this particular embodiment and nitrogen manifold arrangement, simply increasing nitrogen flow rates in the vestibule, even to the point where excess nitrogen begins to seep through the mold-conveyor gap of the steam shield (as shown in Case 5 of FIG. 23), does not prevent oxygen from reaching the product submerging point.

After identifying the trouble spots as discussed above, the inventors, in accordance with step k) of the method, modified the fryer by changing the direction of the primary nitrogen manifold (previously the single nitrogen manifold), adding more nitrogen manifolds in various locations, and redistributing the nitrogen flow among the several nitrogen manifolds. The inventors repeated steps i) through k) until they were satisfied with the results. Afterwards, the primary nitrogen manifold was re-aimed at a downward angle toward the fryer entrance rather than at the product submerging point. FIG. 24 is a comparison of concentration gradients from Case 1, shown in the left column (modified vestibule design), versus Case 9, shown in the right column (initial vestibule design). Even though the modified vestibule and fryer design tested in Case 1 was provided a lower nitrogen flow rate and higher steam flow rate than the original vestibule and fryer design tested in Case 9, the overall oxygen concentration was significantly lower in the modified vestibule of Case 1. Moreover, the oxygen concentration at the product submerging point was less than about 0.5%. This was dramatically lower than the oxygen concentration of roughly 4% at the same location in the original vestibule design as tested in Case 9.

The modified vestibule of Case 1, shown in the left column of FIG. 24, comprised a nitrogen nozzle/manifold slightly downstream of the entrance (pointed down and toward the entrance), an upper steam-shield-gap nozzle pointed toward the gap, and a lower steam-shield-gap nozzle also pointed toward the gap. Although this particular arrangement did improve atmosphere control in the product-entry area, the inventors realized that some steam was still able to pass along the mold conveyor and through the steam-shield gap, even though the nitrogen gas from the upper and lower gap nozzles excluded a significant portion of the steam. The inventors thus further modified the vestibule design by adding to the CFD model a steam-side non-condensable gaseous manifold or nitrogen manifold (downstream from the steam shield) near the steam-shield gap and below the returning portion of the mold conveyor. This steam-side nitrogen manifold having a plurality of nozzles or ports, which is shown in FIGS. 25 through 28, was aimed upwards and introduced nitrogen up against the mold conveyor and through its gaps, thereby further preventing steam from entering the front-end vestibule. Note that while the steam-side manifold was aimed upwards in the preferred embodiment, it is also acceptable to position it above the mold conveyor and aim the gas flow downwards.

Figure 25:
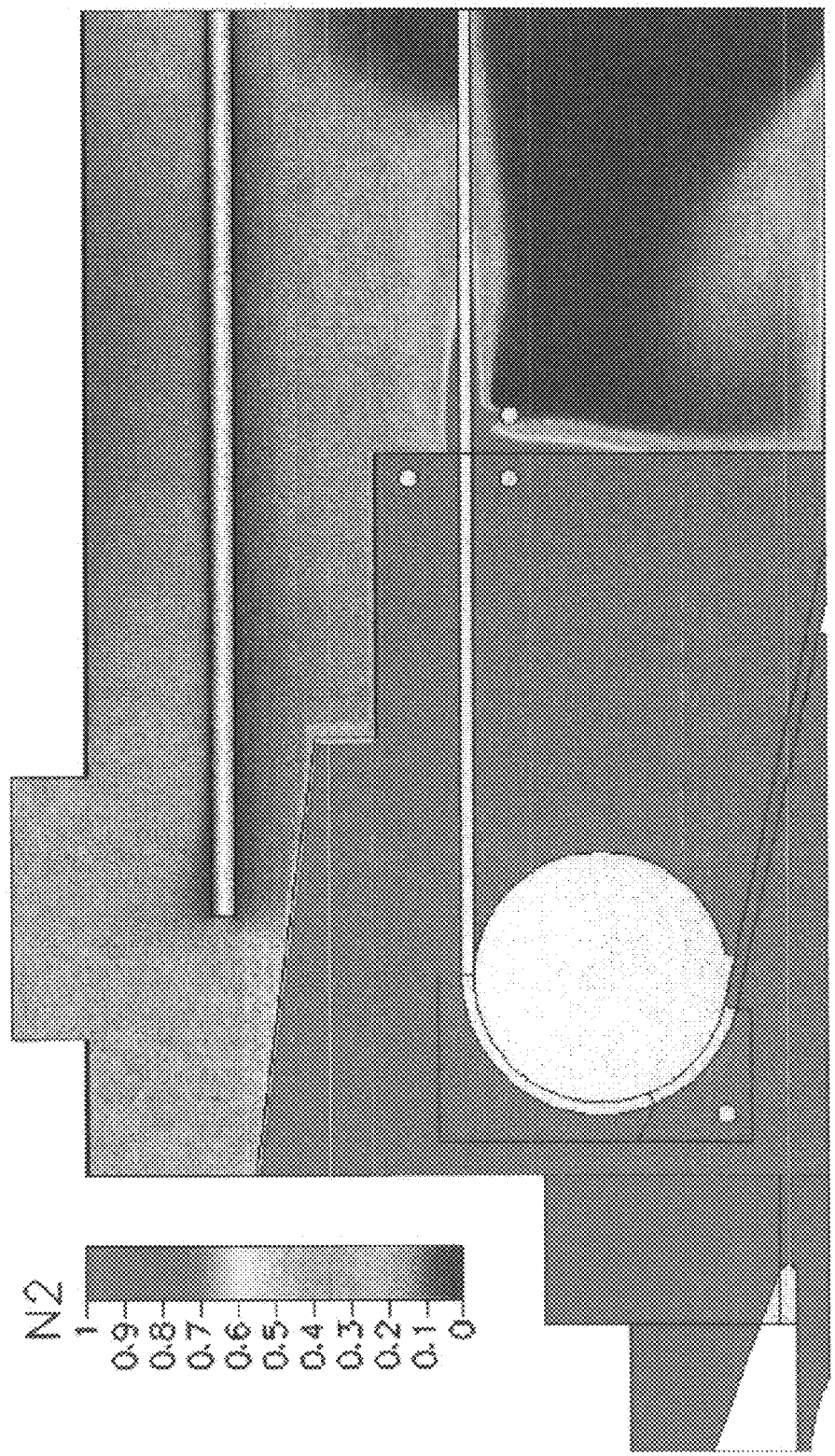
FIG. 25 shows nitrogen concentration gradients in a schematic cross-sectional view of a fryer front end having a vestibule and four nitrogen ports.
Figure 26:
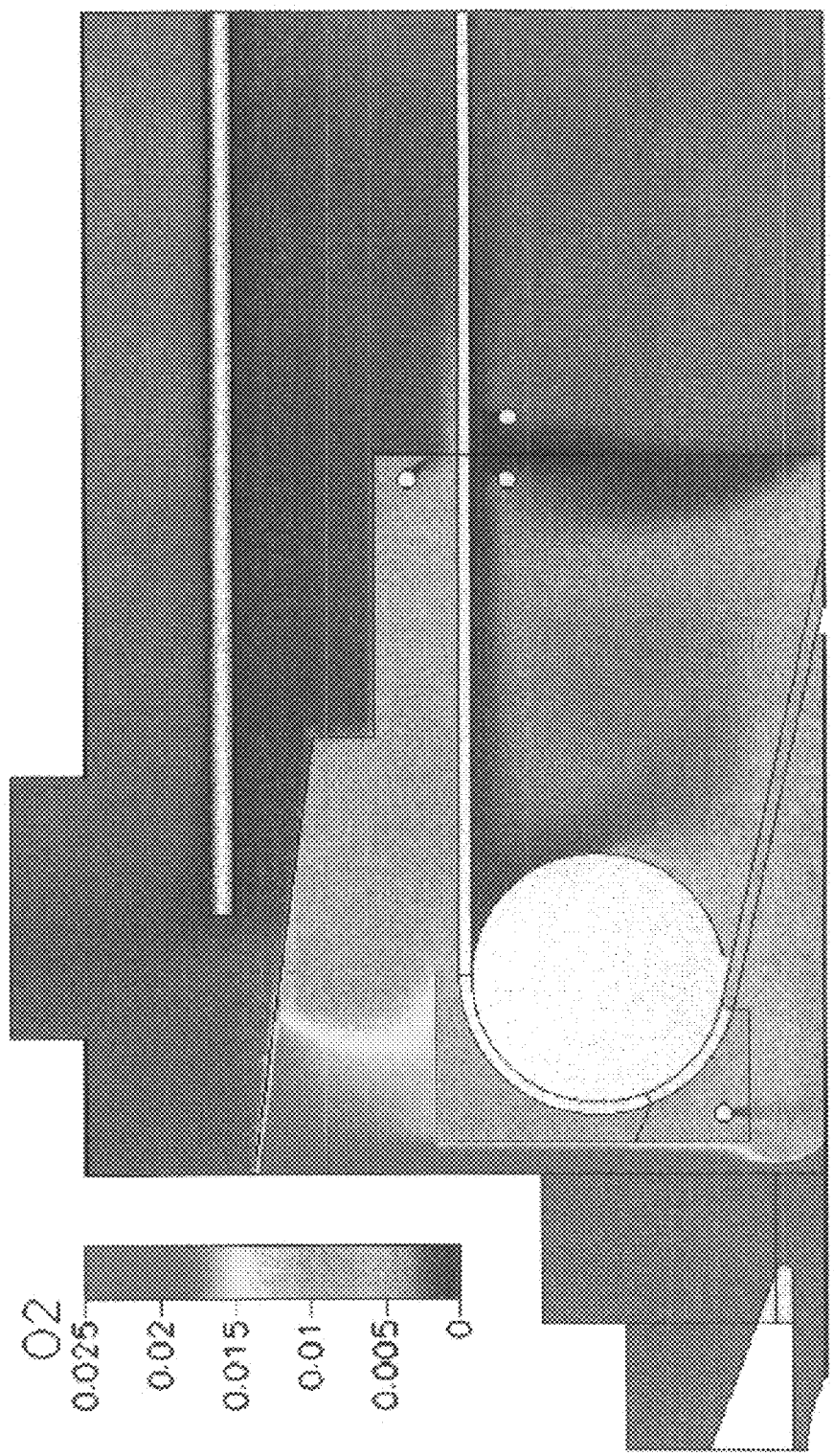
FIG. 26 shows oxygen concentration gradients in the fryer front end shown in FIG. 25.
Figure 27:
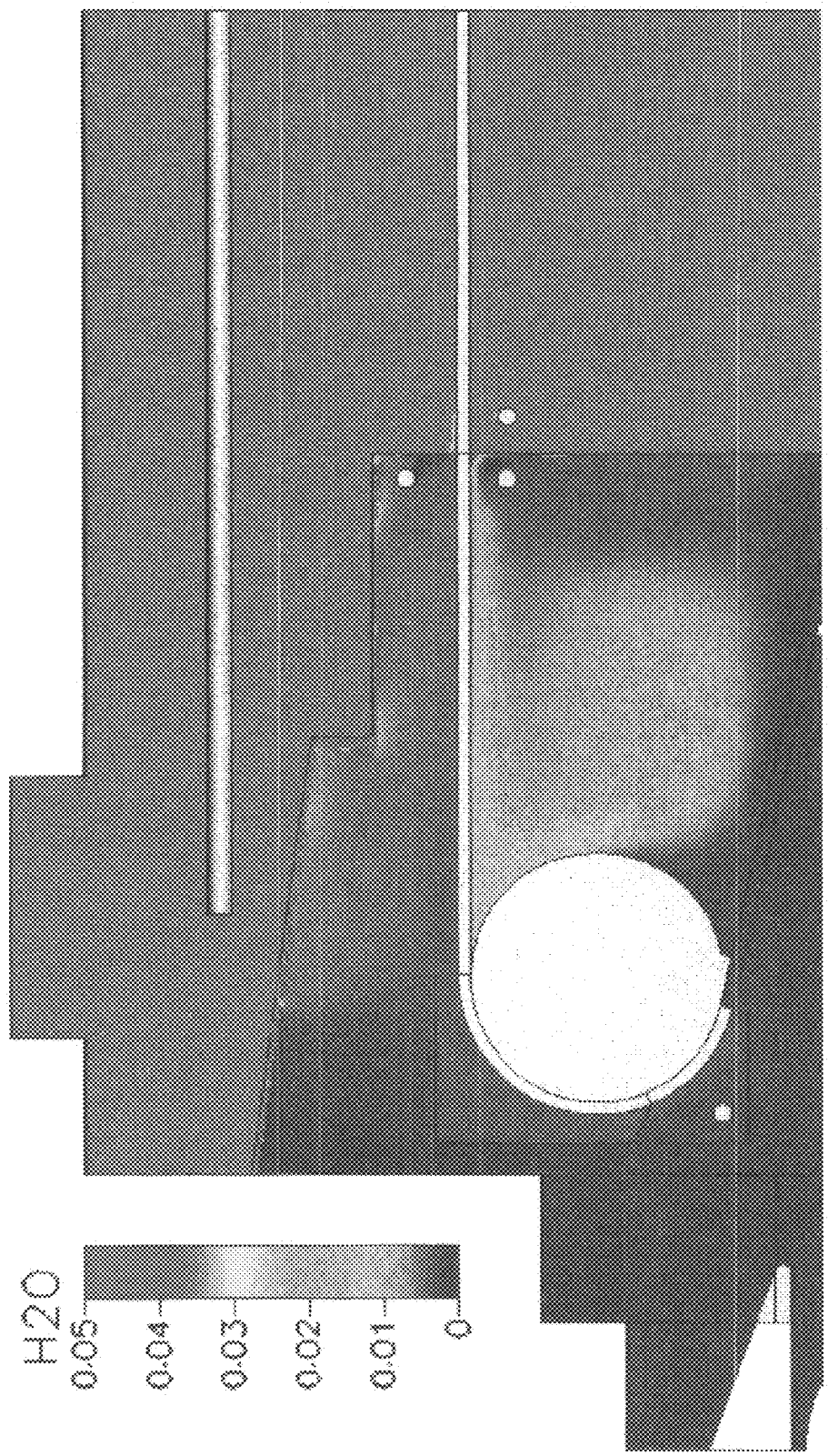
FIG. 27 shows steam concentration gradients in the fryer front end shown in FIG. 25.
Figure 28:
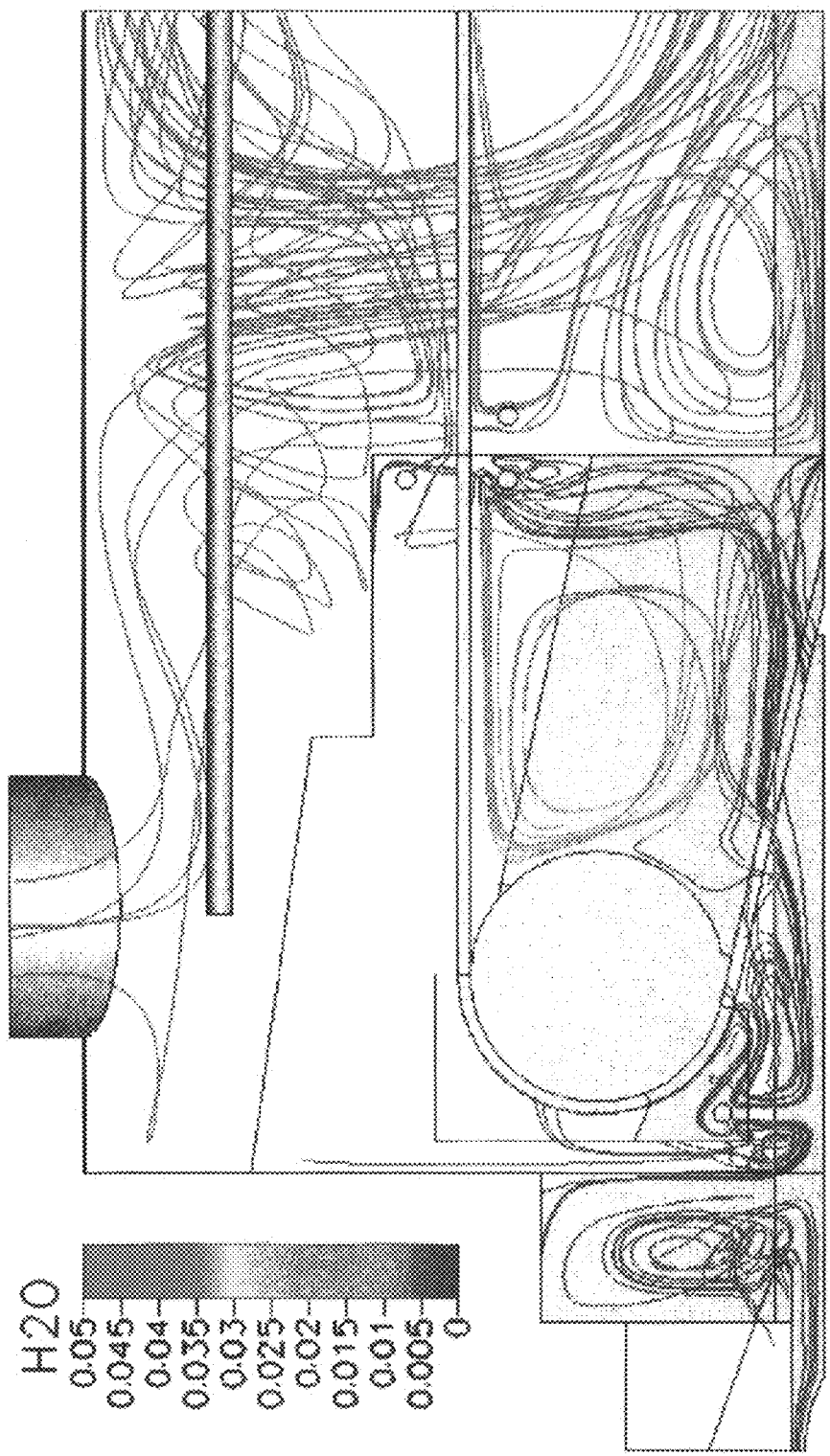
FIG. 28 shows a steam particle trace in a schematic cross-sectional view of the fryer front end shown in FIG. 25.

FIGS. 25 through 28 are color concentration plots and/or particle traces showing the levels of nitrogen, oxygen, and steam, which were measured in accordance with another fryer embodiment resulting from the optimization method enumerated above. In each one of the FIGS. 25 through 28, the concentration levels are represented by color, where red (at the top of the color spectrum) represents relatively higher concentrations, and violet (at the bottom of the color spectrum) represents 0%. With respect to nitrogen concentrations, the represented range is 100% to 0%, from red to violet. With respect to oxygen concentrations, the represented range is 2.5% to 0%, from red to violet. With respect to steam concentrations, the represented range is 5% to 0%, from red to violet. These figures, particularly FIG. 25, show how the steam-side nitrogen manifold serves as a preventative measure in the effort to exclude steam from the front-end vestibule. By using nitrogen to displace the steam in the area immediately surrounding the steam-shield gap on the downstream, steam side of the shield, the steam-side manifold further reduces the amount of steam able to pass through the gap. The steam-side manifold also helps reduce the work load of the vestibule's upper and lower shield-gap manifolds.

Figure 29:
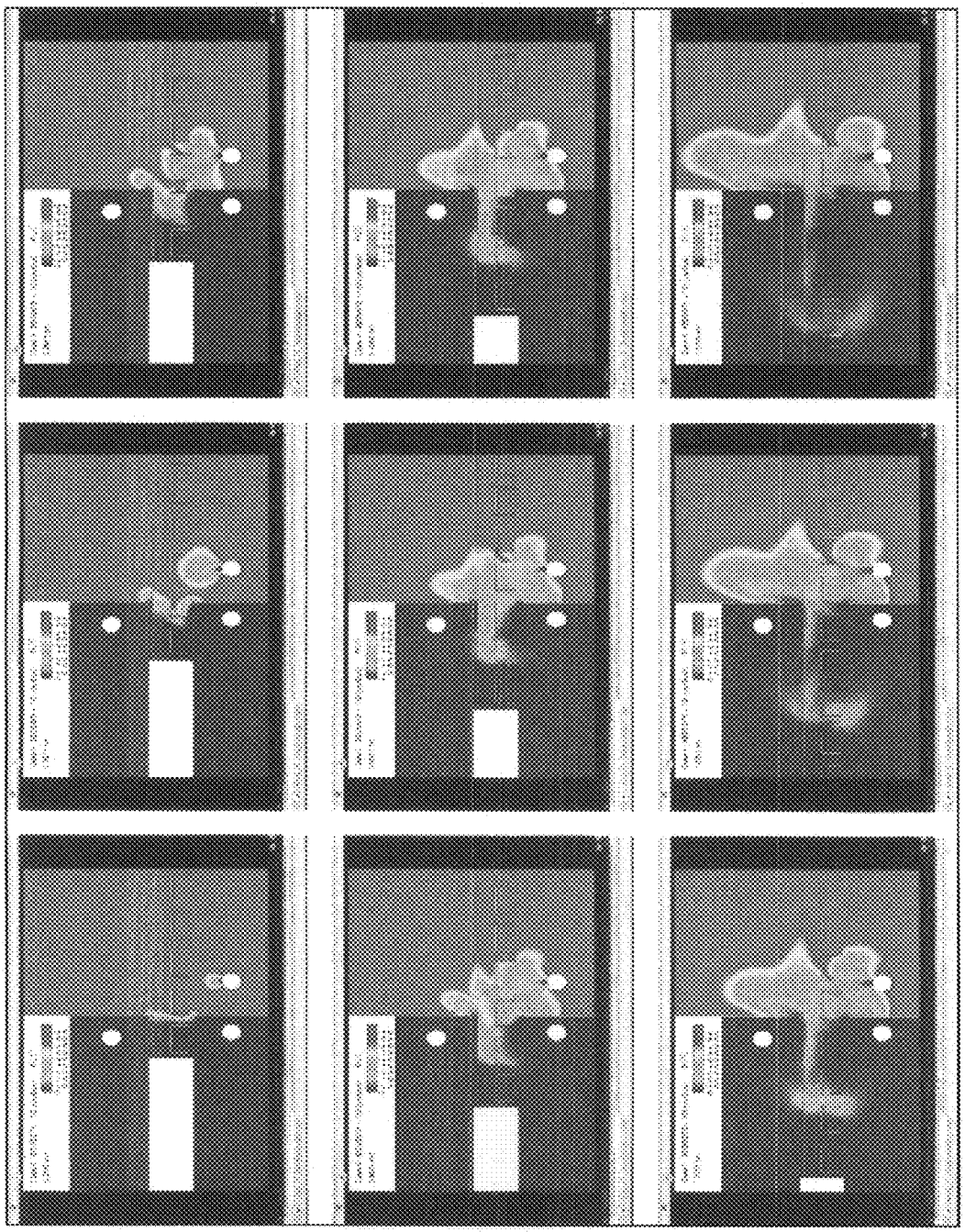
FIG. 29 shows steam concentration gradients in a nine-slide progression over time of an enlarged schematic cross-sectional view of the steam shield gap area shown in FIG. 25.

FIG. 29 shows steam concentration gradients in a nine-slide progression over time of an enlarged schematic cross-sectional view of the steam shield gap area shown in FIG. 25. The slides are arranged 1 through 9 from left to right and top to bottom. This progression of concentration snapshots was developed from the CFD model, with the first slide (taken at 0.0316 seconds into the simulation) showing the initial hypothetical condition wherein the vestibule contains only nitrogen, the upper and lower gap manifolds in the vestibule are introducing nitrogen toward the steam-shield gap, and the steam-side nitrogen manifold has just begun to introduce nitrogen. In the second slide (taken at 0.1579 seconds), nitrogen from the steam-side manifold has displaced a small portion of the steam in the area immediately above the nozzle and has begun to displace steam underneath one of the molds of the mold conveyor. It can be seen that the nitrogen from the upper and lower gap manifolds is flowing towards the gap, thereby hindering steam from passing into the vestibule. Note, however, that the conveyor has pulled a small amount of steam into the front-end vestibule as it moves from right to left, particularly in the volume under the molds of the mold conveyor. The third and fourth slides show the nitrogen from the upper and lower gap manifolds displacing some of the steam in the area immediately downstream of the steam-shield gap. The nitrogen flows from the upper and lower gap manifolds and the steam-side manifold have begun to meet and fill the entire gap area with nitrogen. By the last slide (taken at 1.5795 seconds), it can be seen that the nitrogen from the steam-side manifold has already significantly helped reduce the amount of steam passing through the steam-shield gap by diluting the sparge steam behind the steam-shield gap. Whereas the concentration of steam at the gap was about 50%—as seen in slides 3 and 4—before the steam-side manifold's nitrogen flow reached the gap area, the steam concentration at the gap was reduced to roughly 10-20%—as seen in slide 9—once the steam-side manifold's nitrogen flow had time to disperse to the area behind the steam-shield gap. As can be seen from theses slides, the steam-side nitrogen manifold contributes greatly to the reduction of steam in the vestibule.

Figure 30:
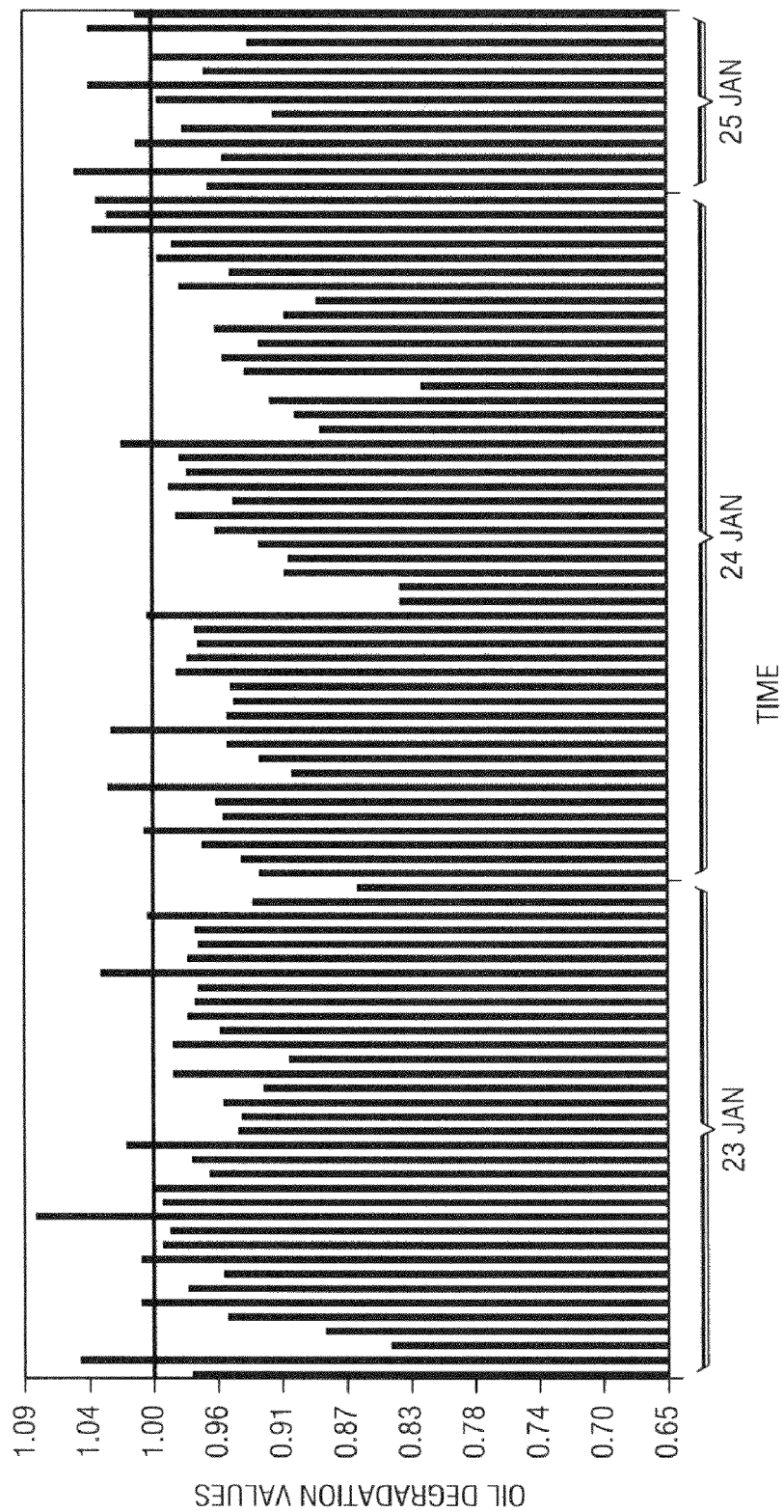
FIG. 30 is a graph of frying oil degradation (y-axis/vertical-axis) versus time (x-axis/horizontal-axis in days) in a fryer without the vestibule improvements of the present invention.

FIG. 30 is a graph of frying oil degradation (y-axis/vertical-axis) versus time (x-axis/horizontal-axis in days) in a fryer without the vestibule improvements of the present invention. Because higher degradation values in the frying oil reduce shelf-life of fried products, it is generally desirable to maintain degradation values as low as possible. In the particular experiment conducted by the inventors, which compares degradation values in the fryer oil before and after adding the vestibule with nitrogen manifolds, the operators were instructed to maintain oil degradation values below a desired threshold. The threshold value is shown as a horizontal line across the bar charts. Note, however, that such threshold value is merely arbitrary and can be of any level, and it depends on the desired product freshness, shelf-life, and other factors. Typically, oil freshness (which corresponds to a low degradation value) is maintained by replacing oxidized or degraded oil with fresh oil, either continuously or by batch.

Figure 31:
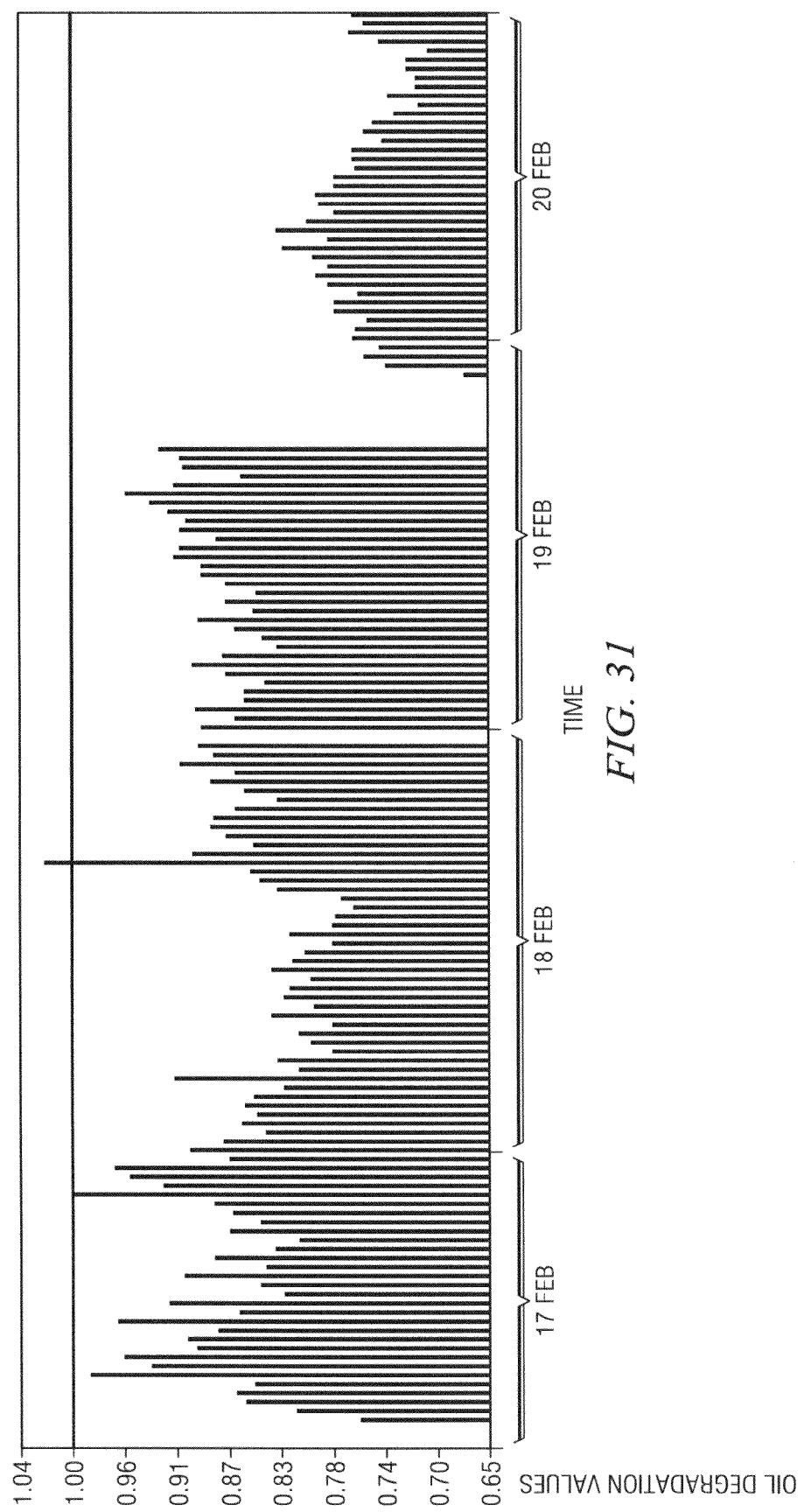
FIG. 31 is a graph of frying oil degradation (y-axis/vertical-axis) versus time (x-axis/horizontal-axis in days) in a fryer having a front-end vestibule in accordance with a preferred embodiment of the present invention.

FIG. 31 is a graph of frying oil degradation values (y-axis/vertical-axis) versus time (x-axis/horizontal-axis in days) in a fryer having a front-end vestibule in accordance with a preferred embodiment of the present invention. In comparing the results of FIG. 30 to those of FIG. 31, one can see a significant improvement in oil quality. Whereas the majority of the oil degradation values before implementing the vestibule and nitrogen manifolds ranged from about 0.83 to about 1.04 of the threshold value, the majority of oil degradation values after implementing the vestibule and nitrogen manifolds ranged from about 0.74 to about 0.91 of the threshold value. Furthermore, in one embodiment, the percentage of oil wasted due to degradation improved by about 50%.

Figure 32:
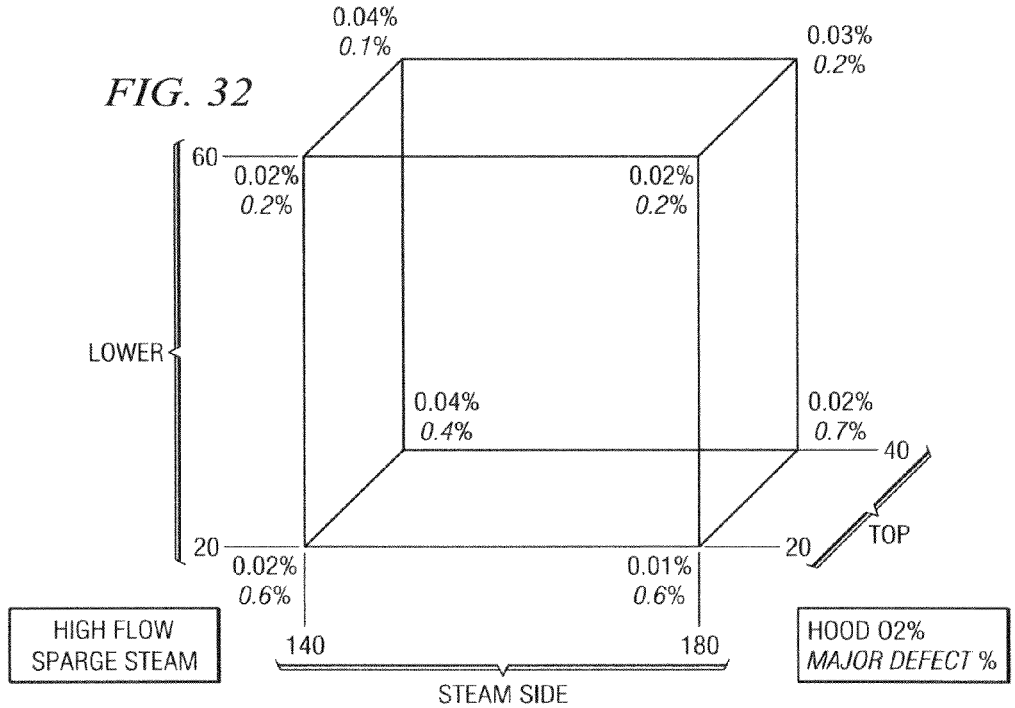
FIG. 32 is a cube plot of oxygen levels and defect data after operating at high flow sparge steam and various flow rates of the nitrogen gas from the upper, lower, and steam-side ports near the steam-shield gap in a preferred embodiment.
Figure 33:
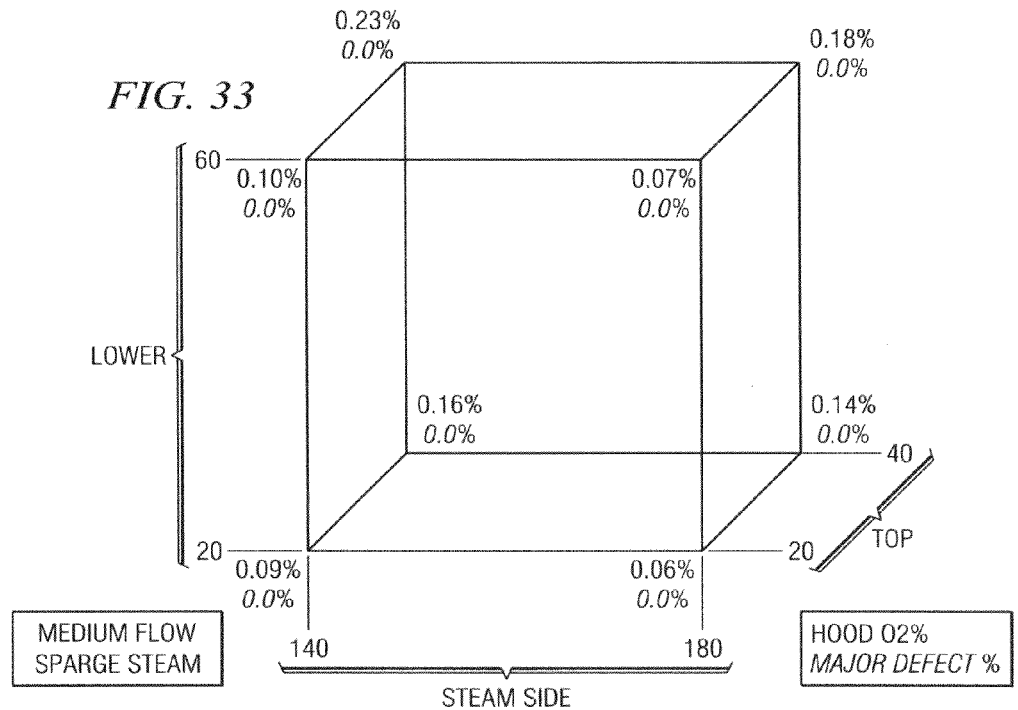
FIG. 33 is a cube plot of oxygen levels and defect data after operating at medium flow sparge steam and various flow rates of the nitrogen gas from the upper, lower, and steam-side ports near the steam-shield gap in a preferred embodiment.

FIG. 32 is a cube plot of oxygen levels and defect data after operating at high sparge steam and various flow rates of the nitrogen gas from the upper, lower, and steam-side ports near the steam-shield gap in a preferred embodiment. FIG. 33 is a cube plot of oxygen levels and defect data after operating at medium sparge steam and various flow rates of the nitrogen gas from the upper, lower, and steam-side ports near the steam-shield gap in a preferred embodiment. In both cube plots, the vertical position (top or bottom of the cube) denotes the nitrogen flow rate through the lower steam-shield gap nitrogen manifold (either 20 standard cubic meters per hour or 60 scmh), the horizontal position denotes the nitrogen flow rate through the steam-side nitrogen manifold (either 140 scmh or 180 scmh), and the depth denotes the nitrogen flow rate through the top/upper steam-shield gap nitrogen manifold (either 20 scmh or 40 scmh). At each of the eight points of the cube plot, which represent the results of the eight experiments, the top number is the oxygen concentration percent seen in the front-end vestibule (or hood), and the bottom number is the major defect percentage seen in the product. For example, when sparge steam was at a high flow rate, the lower gap nitrogen manifold was at 60 scmh, the top gap nitrogen manifold was at 20 scmh, and the steam-side nitrogen manifold was at 140 scmh, the oxygen concentration in the hood was 0.02%, and the fried product exhibited 0.2% major defects due to steam condensation. Experiment results and cube plots, such as the ones shown in FIGS. 32 and 33, can be used to optimize the flow rates of the steam and nitrogen gas to achieve the desired results—in this case, oxygen concentrations of about 0.2% or less, and minimal to no condensate-related major defects. FIG. 33 shows that when the sparge steam is at a medium flow rate, the lower gap nitrogen manifold is between 20 scmh to 60 scmh, the top gap nitrogen manifold is between 20 scmh to 40 scmh, and the steam-side nitrogen manifold is between 140 scmh and 180 scmh, the hood oxygen concentration is at or below about 0.2%, and there were no measurable condensate-related major defects. In practice, the vestibule/steam-shield and nitrogen manifolds increased frying-oil efficiency by more than 50% due to decreased oil degradation rates (oil efficiency=[amount of oil that is actually carried away in good product]/[total amount of oil that is used]) and reduced the amount of steam related product defects.

The nitrogen (or other inert gas manifolds) manifolds preferably comprise a multi-ported manifold for introducing a curtain of nitrogen gas having a relatively uniform distribution. The multiple nitrogen flows from each single nozzle or port should ideally join together shortly after leaving each port in order to form such a curtain of inert gas. In one embodiment, each port has fan-shaped tips for spreading the nitrogen gas in several directions, thus creating an overall gaseous curtain. In one embodiment, this curtain of gas runs the width of the vestibule opening. The objective is to flush, with a flow stream, the vestibule opening to prevent non-condensable gases from entering the vestibule. Thus, other devices for introducing a curtain of inert gas of which those skilled in the art may be aware can also be used without departing from the spirit and scope of the present invention.

In one embodiment, the inert gas is pre-heated prior to being introduced into the environment. The non-condensable inert gas is preferably preheated to a temperature of more than about 212° F., more preferably pre-heated to a temperature of more than 300° F., and most preferably heated to a temperature of more than about 350° F. Heating the inert gas reduces its density and thereby increases its volume in the open environment which will improve the effectiveness of a given amount of gas and allow for a reduction in inert gas usage to achieve a given performance. In addition, a heated non-condensable gas contributes to a lower dewpoint in the vestibule, further decreasing the rate of product defects. It is recognized that one skilled in the art could also extend this concept to include using superheated steam as an inert non-condensing gas if the steam were superheated sufficiently.

Note that this invention can be applied to other types of fryers and other food product dehydration systems where steam condensation is a problem. For example, in a conventional deep-frying device (batch or continuous) where the product to be fried is introduced at one end of the fryer and removed at the other end, the front-end feeding area immediately above the frying oil can be separated from the main body of the fryer with a steam shield so that steam evolved from frying does not travel upstream and condense on the cooler-temperature, entering products. If frying oil degradation is also of concern, the front end of the fryer, upstream from the steam shield, can be enclosed to form a vestibule, and inert gas manifolds, nozzles, and/or ports can be used to displace the oxygen within the vestibule. The vestibule effectiveness can be optimized by the CFD modeling method discussed above. Other methods of optimizing, however, can be used including but not limited to brute-force experimentation and pilot-plant modeling. In a brute-force method of optimization, for example, the pre-existing fryer is tested and then modified progressively with repeated tests throughout for comparisons of different combinations of variables, and a final arrangement is found by using the settings that produced the most favorable results. If mathematical modeling is used, several tests results are taken, and those data points are then interpolated to derive a mathematical relationship between input variables and output results. Those mathematical relationships can then be used to determine the theoretical optimal arrangement and/or flow rates.

While the invention has been particularly shown and described with reference to a preferred embodiment, it will be understood by those skilled in the art that various changes in form and detail may be made therein without departing from the spirit and scope of the invention.

We claim:

1. A method for optimizing fryer atmosphere control in a fryer comprising:
   an oil pan for containing frying oil;
   a fryer hood enclosing the volume immediately above the oil pan;
   at least one steam stack on said fryer hood with a damper or fan
   an upstream end having a vestibule with a steam shield, said upstream end for receiving a product to be fried in said oil pan, wherein said vestibule encompasses a product-entry point where the product will enter the frying oil during operation;
   a fryer midsection adjacent said upstream end;
   a downstream end adjacent said fryer midsection for removing the product;
   wherein said steam shield is positioned slightly downstream from the product-entry point and located within the fryer hood, thereby separating said upstream end from said fryer midsection;
   said method comprising the following steps:
   a) positioning a first non-condensable inert gas manifold in the upstream end and within the fryer hood for introducing an inert gas;
   b) introducing said inert gas through said first inert gas manifold at an inert-gas flow rate;
   c) introducing sparge steam into the fryer midsection within the fryer hood at a sparge-steam flow rate;
   d) measuring the effectiveness of the first inert gas manifold in preventing sparge steam from reaching the product entry point;
   e) identifying trouble spots in the fryer, if any, where steam concentrations are greater than a predetermined maximum acceptable steam concentration;
   f) modifying the fryer at the trouble spots by performing one or more of the following: changing the sparge-steam flow rate, changing the inert-gas flow rate, changing the direction of feeding of the inert gas, and adding an additional inert gas manifold; and
   g) repeating steps d) through f) until the concentration of steam at the product entry point is less than a predetermined maximum acceptable steam concentration.

2. The method in claim 1 wherein said non-condensable inert gas is pre-heated.

3. A method for reducing oil degradation and fried product defects in a fryer, said method comprising the steps of:
   a) supplying a fryer comprising:
   an oil pan for containing frying oil;
   a fryer hood enclosing the volume immediately above the oil pan;
   at least one steam stack on said fryer hood with a damper or fan;
   an upstream end having a vestibule with a steam shield, said upstream end for receiving a product to be fried in said oil pan, wherein said vestibule encompasses a product-entry point where the product will enter the frying oil during operation, and wherein said vestibule further encompasses at least one manifold having at least one nozzle or port;
   a fryer midsection adjacent said upstream end;
   a downstream end adjacent said fryer midsection for removing the product;
   wherein said steam shield is positioned slightly downstream from the product-entry point and located within the fryer hood, thereby separating said upstream end from said fryer midsection;
   b) positioning said manifold and said nozzles;
   c) introducing a non-condensable inert gas into said manifold and said nozzles in step b) to create a sufficiently low condensable gas environment and a sufficiently low oxygen environment in said vestibule, wherein said low condensable gas environment comprises a dewpoint temperature and a vestibule temperature, wherein said dewpoint temperature is more than about 1 degree Fahrenheit above said vestibule temperature.

4. The method of claim 3 wherein said non-condensable inert gas is pre-heated.

5. The method of claim 3 wherein said low condensable gas environment comprises a dewpoint temperature and a vestibule temperature, wherein said dewpoint temperature is more than about 5 degrees Fahrenheit above said vestibule temperature.

6. The method of claim 3 wherein said low oxygen environment comprises less than 1% by weight oxygen.

7. The method of claim 3 wherein said nozzles produce a curtain across a vestibule opening.

8. The method of claim 3 wherein said non-condensable inert gas at step c) comprises superheated steam.

9. A method for optimizing fryer atmosphere control in a fryer comprising:
   an oil pan;
   a frying oil contained within said oil pan;
   a fryer hood enclosing the volume immediately above the oil pan;
   at least one steam stack on said fryer hood with a damper or fan:
   an upstream end for receiving a product to be fried in said oil pan;
   a product-entry point where the product will enter the frying oil during operation;
   a fryer midsection adjacent said upstream end;
   a downstream end adjacent said fryer midsection for removing the product;
   a mold conveyor positioned within said fryer hood and at least partially submerged within said frying oil, wherein said mold conveyor is designed to mate with the product after entering the frying oil, said mold conveyor further comprising a submerging section and a return section;
   a steam shield positioned slightly downstream from the product-entry point and located within the fryer hood, thereby separating said upstream end from said fryer midsection and defining a front-end vestibule, said steam shield further comprising a steam-shield gap through which said mold conveyor can pass; and
   a plurality of non-condensable inert gas manifolds, each manifold having a plurality of ports for introducing an inert gas, wherein said manifolds are positioned near the product entry point and/or near the vestibule opening;
said method comprising the following steps:
   a) introducing said inert gas through a plurality of first inert gas ports at a port-gas flow rate;
   b) introducing sparge steam into the fryer midsection within the fryer hood at a sparge-steam flow rate;
   c) creating a resultant CFD model of the front-end vestibule by:
   (i) measuring the concentrations of oxygen, steam, and the inert gas at several points throughout the front-end vestibule;
   (ii) changing the port gas flow rate and sparge-steam flow rate;
   (iii) repeating sub-steps (i) through (ii) until sufficient measurements have been taken to create a CFD model of the front-end vestibule; and
   (iv) correlating the data from sub-steps (i) through (iii) with environment properties including but not limited to temperatures, volumes, physical dimensions, and pressures, thereby creating a CFD model of the front-end vestibule;
   d) conducting simulations of the resultant CFD model created at step c) to predict dynamic and steady state resultant environment properties inside the fryer including desired gas concentrations, temperatures, flow patterns, and pressures;
   e) calculating and plotting said resultant environment properties from said resultant CFD model;
   f) measuring the resultant environment properties in areas of interest;
   g) identifying trouble spots in the resultant CFD model, if any, where steam concentrations and/or oxygen is higher than desired;
   h) modifying the CFD model at the trouble spots by modifying any of the variables that affect the environment including but not limited to changing in the CFD model the sparge-steam flow rate, changing the inert-gas flow rate, changing the direction of feeding of the inert gas, adding an additional manifold, modifying a vestibule geometry and modifying the inert gas ports; and
   i) repeating steps d) through h) until the concentration of steam at the product entry point of the CFD model is less than a desired maximum acceptable steam concentration and the oxygen concentration is below a maximum acceptable level.

\* \* \* \* \*